United States Patent
Zheng et al.

(10) Patent No.: US 9,683,858 B2
(45) Date of Patent: *Jun. 20, 2017

(54) LEARNING TRANSPORTATION MODES FROM RAW GPS DATA

(71) Applicant: Microsoft Technology Licensing, LLC., Redmond, WA (US)

(72) Inventors: Yu Zheng, Beijing (CN); Longhao Wang, Beijing (CN); Like Liu, Beijing (CN); Xing Xie, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 864 days.

This patent is subject to a terminal disclaimer.

(21) Appl. No.: 13/674,579

(22) Filed: Nov. 12, 2012

(65) Prior Publication Data

US 2013/0073202 A1  Mar. 21, 2013

Related U.S. Application Data

(63) Continuation of application No. 13/195,496, filed on Aug. 1, 2011, now Pat. No. 8,315,959, which is a
(Continued)

(51) Int. Cl.
*G06F 15/18* (2006.01)
*G01C 21/34* (2006.01)
(Continued)

(52) U.S. Cl.
CPC ......... *G01C 21/3423* (2013.01); *G01C 21/20* (2013.01); *G06N 99/005* (2013.01); *G08G 1/0112* (2013.01)

(58) Field of Classification Search
CPC combination set(s) only.
See application file for complete search history.

(56) References Cited

U.S. PATENT DOCUMENTS 5,428,546 A   6/1995 Shah
5,802,492 A   9/1998 DeLorme et al.
(Continued)

FOREIGN PATENT DOCUMENTS

EP   1087605 A2   3/2001
GB   2421653 A    6/2006
(Continued)

OTHER PUBLICATIONS

Low Cost Differential GPS Receivers (LCD-GPS): The Differential Correction Function Messaoud Kara; Kun-Mean Hou 2008 New Technologies, Mobility and Security Year: 2008 pp. 1-6, DOI: 10.1109/NTMS.2008.ECP.58 IEEE Conference Publications.*
(Continued)

*Primary Examiner* — Michael B Holmes
(74) *Attorney, Agent, or Firm* — Micky Minhas

(57) ABSTRACT

Described is a technology by which raw GPS data is processed into segments of a trip, with a predicted mode of transportation (e.g., walking, car, bus, bicycling) determined for each segment. The determined transportation modes may be used to tag the GPS data with transportation mode information, and/or dynamically used. Segments are first characterized as walk segments or non-walk segments based on velocity and/or acceleration. Features corresponding to each of those walk segments or non-walk segments are extracted, and analyzed with an inference model to determine probabilities for the possible modes of transportation for each segment. Post-processing may be used to modify the probabilities based on transitioning considerations with respect to the transportation mode of an adjacent segment. The most probable transportation mode for each segment is selected.

22 Claims, 8 Drawing Sheets

Related U.S. Application Data continuation of application No. 12/037,305, filed on Feb. 26, 2008, now Pat. No. 8,015,144.

(51) Int. Cl.
*G01C 21/20* (2006.01)
*G06N 99/00* (2010.01)
*G08G 1/01* (2006.01)

(56) References Cited

U.S. PATENT DOCUMENTS

| | | |
|---|---|---|
| 5,845,227 A | 12/1998 | Peterson |
| 5,904,727 A | 5/1999 | Prabhakaran |
| 6,023,241 A | 2/2000 | Clapper |
| 6,091,359 A | 7/2000 | Geier |
| 6,091,956 A | 7/2000 | Hollenberg |
| 6,122,628 A | 9/2000 | Castelli et al. |
| 6,128,279 A | 10/2000 | O'Neil et al. |
| 6,219,662 B1 | 4/2001 | Fuh et al. |
| 6,243,647 B1 | 6/2001 | Berstis et al. |
| 6,317,684 B1 | 11/2001 | Roeseler et al. |
| 6,317,686 B1 | 11/2001 | Ran |
| 6,351,775 B1 | 2/2002 | Yu |
| 6,356,838 B1 | 3/2002 | Paul |
| 6,385,539 B1 | 5/2002 | Wilson et al. |
| 6,411,897 B1 | 6/2002 | Gaspard, II |
| 6,424,370 B1 | 7/2002 | Courney |
| 6,427,122 B1 | 7/2002 | Lin |
| 6,430,547 B1 | 8/2002 | Busche et al. |
| 6,446,121 B1 | 9/2002 | Shah et al. |
| 6,493,650 B1 | 12/2002 | Rodgers et al. |
| 6,496,814 B1 | 12/2002 | Busche et al. |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Due |
| 6,785,704 B1 | 8/2004 | McCanne |
| 6,816,779 B2 | 11/2004 | Chen et al. |
| 6,904,160 B2 | 6/2005 | Burgess |
| 6,919,842 B2 | 7/2005 | Cho |
| 6,919,872 B2 | 7/2005 | Park et al. |
| 6,925,447 B2 | 8/2005 | Mcmenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,529,617 B2 | 5/2009 | Ono et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz et al. |
| 7,743,081 B2 | 6/2010 | Roberts |
| 7,801,842 B2 | 9/2010 | Dalton |
| 7,840,407 B2 | 11/2010 | Strope et al. |
| 7,860,891 B2 | 12/2010 | Adler et al. |
| 7,904,530 B2 | 3/2011 | Partridge et al. |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,015,144 B2 * | 9/2011 | Zheng .................... G01C 21/20 706/21 |
| 8,060,462 B2 | 11/2011 | Flinn et al. |
| 8,078,394 B2 | 12/2011 | Wang et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 | 7/2012 | Youssef et al. |
| 8,275,649 B2 * | 9/2012 | Zheng .................... G06Q 30/02 705/7.29 |
| 8,315,959 B2 * | 11/2012 | Zheng .................... G01C 21/20 706/14 |
| 8,458,298 B2 | 6/2013 | Josefsberg et al. |
| 8,510,315 B2 * | 8/2013 | Zheng .................... G06Q 10/08 707/723 |
| 8,543,320 B2 * | 9/2013 | Zheng .................. G08G 1/0129 701/117 |
| 8,562,439 B2 | 10/2013 | Shuman et al. |
| 8,577,380 B2 | 11/2013 | Martinez et al. |
| 8,612,134 B2 | 12/2013 | Zheng et al. |
| 8,719,198 B2 | 5/2014 | Zheng et al. |
| 8,972,177 B2 * | 3/2015 | Zheng .................. G06F 17/3087 340/995.27 |
| 9,123,259 B2 * | 9/2015 | Zheng .................... G06K 9/62 |
| 9,261,376 B2 * | 2/2016 | Zheng ................ G01C 21/3484 |
| 2002/0032689 A1 | 3/2002 | Abbott et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |

(56) References Cited

U.S. PATENT DOCUMENTS

| | | |
|---|---|---|
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059061 A1* | 3/2008 | Lee ................ G01C 21/3423 701/412 |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynic et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0176000 A1 | 7/2011 | Budge et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0208426 A1 | 8/2011 | Zheng et al. |
| 2011/0208429 A1 | 8/2011 | Zheng et al. |
| 2011/0280453 A1 | 11/2011 | Chen et al. |
| 2011/0282798 A1 | 11/2011 | Zheng et al. |
| 2011/0301832 A1 | 12/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2013/0151297 A1 | 6/2013 | Zheng et al. |

FOREIGN PATENT DOCUMENTS

| | | |
|---|---|---|
| JP | 2002140362 | 5/2002 |
| JP | 2002-304408 A | 10/2002 |
| JP | 2003-044503 A | 2/2003 |
| KR | 1020050072555 A | 7/2005 |
| KR | 1020060006271 A | 1/2006 |
| KR | 100650389 B1 | 11/2006 |
| WO | WO 2006097907 A2 | 9/2006 |
| WO | WO 2007087615 C1 | 11/2007 |
| WO | WO 2007145625 A1 | 12/2007 |
| WO | WO 2009053411 A1 | 4/2009 |
| WO | WO 2010062726 A2 | 6/2010 |

OTHER PUBLICATIONS

Trip Based Power Management of Plug-in Hybrid Electric Vehicle with Two-Scale Dynamic Programming Qiuming Gong; Yaoyu Li; Zhong-Ren Peng 2007 IEEE Vehicle Power and Propulsion Conference Year: 2007 pp. 12-19, DOI: 10.1109/VPPC.2007.4544089 IEEE Conference Publications.*

Research on the Visualization of Equipment Support Based on the Technology of Internet of Things Zhu Yu; Wang Tie-Ning Instru-

(56) References Cited

OTHER PUBLICATIONS mentation, Measurement, Computer, Communication and Control (IMCCC), 2012 Second International Conference on Year: 2012 pp. 1352-1357, DOI: 10.1109/IMCCC.2012.318 IEEE Conference Publications.*
Brownian gossip: exploiting node mobility to diffuse information in ad hoc networks R. R. Choudhury 2005 International Conference on Collaborative Computing: Networking, Applications and Worksharing Year: 2005 p. 5 pp., DOI: 10.1109/COLCOM.2005.1651262 IEEE Conference Publications.*
"Office Action Issued for European Patent Application No. 09715263.1", Mailed Date: Feb. 16, 2015, 5 Pages.
"Bikely Reviews", website, 2010, retrieved on Jan. 18, 2008, at <<http://www.bikely.com/>>, 1 page.
"CRF++: Yet Another CRF Toolkit", retrieved on Jan. 18, 2008, at <<http://crfpp.sourceforge.net>>, 13 pages.
"GPS Track Route Exchange Forum", 2010 GPSXchange.com website, retrieved on Apr. 16, 2010 at <<http://www.gpsxchange.com/phpBB2/index.php, 3 pages.
"SlamXR List Routes Page By Microsoft Research Community Technologies Group", retrieved on Jan. 18, 2008 at <http://www.msslam.com/slamxr/ListRoutes.aspx>, 2 pages.
"SportsDo", retrieved on Jan. 17, 2008 at <http://sportsdo.net/Activity/ActivityBlog.aspx>, 3 pages.
"Twittervision", retrieved on Jan. 18, 2008, at <http://twittervision.com>, 1 page.
"Weka 3: Data Mining Software in Java", retrieved on Jan. 18, 2008 at <http://www.cs.waikato.ac.nz/ml/weka/index-home.html>, 1 page.
"Welcome to WalkJogRun", retrieved on Jan. 17, 2008 at <http://www.walkjogrun.net>, 1 page.
"WikiWalki Community Trail Guide", retrieved on Jan. 17, 2008 at <http://www.wikiwalki.com>, 1 page.
Abowd et al., "Cyberguide: A Mobile Context-Aware Tour Guide", Wireless Networks, vol. 3, Oct. 1997, pp. 421-433, 13 pages.
Adomavicius et al., "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749, 16 pages.
Agarwal et al., "Geometric Approximation via Coresets," Combinatorial and Computational Geometry, 2005, vol. 2, pp. 1-30, 23 pages.
Agarwal et al., "Mining Sequential Patterns", Proceedings of ICDE 1995, Mar. 1995, 12 pages.
Agrawal et al., "Efficient Similarity Search in Sequence Databases," In FODO, 1993, pp. 69-84, 16 pages.
Agrawal et al., "Mining Association Rules between Sets of Items in Large Databases", ACM, Proceedings of SIGMOD 1993, Jun. 1993, pp. 207-216, 10 pages.
Ahern et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10, 10 pages.
Aizawa et al., "Capture and Efficient Retrieval of Life Log", available at least as early as Nov. 16, 2007, 6 pages.
Aizawa, "Digitizing Personal Experiences: Capture and Retrieval of Life Log", Proceedings of the 11th International Multimedia Modelling Conference (MMM'05), Jan. 2005, abstract, 1 page.
Ankerst et al., "OPTICS: Ordering Points to Identify the Clustering Structure", Proceedings of the ACM SIGMOD 1999 International Conference on Management of Data, Philadelphia, Pennsylvania, Jun. 1-3, 1999, pp. 49-60, 12 pages.
Ashbrook et al., "Using GPS to Learn Significant Locations and Predict Movement Across Multiple Users", Journal Personal and Ubiquitous Computing archive, vol. 7 Issue 5, Oct. 2003, 15 pages.
Belussi et al, "Estimating the Selectivity of Spatial Queries Using the 'Correlation' Fractal Dimension", Proceedings of Conference on Very Large Data Bases (VLDB), Sep. 1995, pp. 299-310, 12 pages.
Bing DITU Map Search (former Live Ditu Map Search), Microsoft Corporation, retrieved at <http://cn.bing.com/ditu/>, 2 pages.

Bohm, "A Cost Model for Query Processing in High Dimensional Data Spaces," TODS, 2000, vol. 25, Issue 2, pp. 129-178, 43 pages.
Brakatsoulas, et al., "On Map-Matching Vehicle Tracking Data", VLDB Endowment, In the Proceedings of the 31st International on Conference on Very Large Data Bases, Sep. 2005, pp. 853-864, 12 pages.
Brunato, Battiti, "A Location-Dependent Recommender System for the Web", MobEA Workshop, Budapest, May 2003, pp. 1-5, 5 pages.
Cai, "Indexing Spatio-Temporal Trajectories with Chebyshev Polynomials", ACM, Conference on Management of Data, Jun. 13-18, 2004, pp. 599-610, 12 pages.
Cao et al., "Mining Frequent Spatio-temporal Sequential Patterns", IEEE Computer Society, ICDM 2005, Nov. 2005, pp. 82-89, 8 pages.
Carter et al., "When Participants Do the Capturing: The Role of Media in Diary Studies," Proceedings of the SIGCHI 2005 Conference on Human Factors in Computing Systems, ACM Press, 2005, pp. 899-908, 10 pages.
Chakka et al., "Indexing Large Trajectory Data Sets with SETI," Proc. of the Conf. on Innovative Data Systems Research (CIDR), 2003, Ann Arbor 1001, 48109-2122, 12 pages.
Chan et al, "Efficient Time Series Matching by Wavelets", IEEE Computer Society, Proceedings of Conference on Data Engineering (ICDE), Mar. 1999, pp. 126-133, 8 pages.
Chen et al, "On the Marriage of Lp-norms and Edit Distance", Proceedings of Conference on Very Large Data Bases (VLDB), Aug. 29-Sep. 3, 2004, pp. 792-803, 12 pages.
Chen et al, "Robust and Fast Similarity Search for Moving Object Trajectories", ACM Conference on Management of Data, Jun. 2005, pp. 491-502, 12 pages.
Chen et al., "GeoTracker: Geospatial and Temporal RSS Navigation", Proceedings of the 16th International World Wide Web Conference, Banff, Alberta, Canada, May 8-12, 2007, pp. 41-50, 10 pages.
Chen et al., "GeoTV: Navigating Geocoded RSS to Create an IPTV Experience", Proceedings of the 16th International World Wide Web Conference, Banff, Alberta, Canada, May 8-12, 2007, pp. 1323-1324, 2 pages.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, pp. 255-266, 12 pages.
Cranshaw et al., "Bridging the Gap Between the Physical Location and Online Social Networks," in Proc. Ubicomp 2010, ACM Press, pp. 119-128, 10 pages.
Dillenburg et al., "Improving Search Efficiency Using Possible Subgoals," Mathematical and Computer Modeling, vol. 22, No. 4, 1995, pp. 397-414, 18 pages.
Ding et al, "Querying and Mining of Time Series Data: Experimental Comparison of Representations and Distance Measures", VLDB Endowment, PVLDB'08, Aug. 23-28, 2008, pp. 1542-1552, 11 pages.
Dumais et al., "Stuff I've Seen: A System for Personal Information Retrieval and Re-use," Proceedings of the 26th Annual International ACM SIGIR Conference on Research and Development in Information Retrieval, ACM 2003, pp. 72-79, 8 pages.
Eagle et al, "Community Computing: Comparisons between Rural and Urban Societies using Mobile Phone Data," 2009 International Conference on Computational Science and Engineering, pp. 144-150, 7 pages.
Eagle et al, "Reality Mining: Sensing Complex Social Systems", Springer-Verlag London, Personal and Ubiquitous Computing, vol. 10, Issue 4, Mar. 2006, pp. 255-268, 14 pages.
Estivill-Castro et al, "Data Mining Techniques for Autonomous Exploration of Large Volumes of Geo-referenced Crime Data", Proceedings of the 6th International Conference on GeoComputation, University of Queensland, Brisbane, Australia, Sep. 24-26, 2001, 12 pages.
Faloutsos et al, "Fast Subsequence Matching in Time-Series Databases," Proceedings of the 1994 ACM SIGMOD International Conference on Management of Data , vol. 23, No. 2, Jun. 1994, pp. 419-429, 11 pages.

(56) References Cited

OTHER PUBLICATIONS

Flickr, retrieved at <http://www.flickr.com/>, 1 page.
Freeman et al., "Lifestreams: A Storage Model for Personal Data," Proc. of SIGMOD 1996, ACM Press, 1996, pp. 80-86, 7 pages.
Frentzos et al, "Algorithms for Nearest Neighbor Search on Moving Object Trajectories", retrieved on Apr. 15, 2010 at http://infolab.cs.unipi.gr/pubs/journals/FGPT06-Geoinformatica.pdf>>, Kluwer Academic Publishers, Geoinformatica, vol. 11, No. 2, Jun. 2007, pp. 159-193, 32 pages.
Frentzos et al, "Index-based Most Similar Trajectory Search", retrieved on Apr. 15, 2010 at >, IEEE Conference on Data Engineering (Technical Report UNIPI-ISL-TR-2006-01), Jun. 2006, pp. 816-825, 12 pages.
Fu et al., "Heuristic Shortest Path Algorithms for Transportation Applications: State of the Art," Computer in Operations Research, vol. 33, No. 11, pp. 3324-3343, 2006, 20 pages.
Ge et al., "An Energy-Efficient Mobile Recommender System," National Science Foundation, Rutgers CCC Green Computing Initiative, National Natural Science Foundation, retrieved at <<http://pegasus.rutgers.edu/~yongge/KDD10-MRS.pdf>>, In Proc. KDD 2010, ACM Press (2010), pp. 899-908, 9 pages.
Gemmell et al., "MyLifeBits: A Personal Database for Everything," Communications of the ACM, 2006, vol. 49, No. 1, pp. 88-95, 18 pages.
GeoLife GPS Trajectories, retrieved at http://research.microsoft.com/en-us/downloads/b16d359d-d164-469e-9fd4-daa38f2b2e13/default.aspx on Aug. 9, 2012, 5 pages.
Giannotti et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357, 12 pages.
Giannotti et al., "Trajectory Pattern Mining", retrieved on Aug. 4, 2009 at <<http://cs.gmu.edu/~jessica/temp/p330-giannotti.pdf>>, ACM KDD'07, Aug. 2007, pp. 330-339, 10 pages.
Goldberg et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pages.
Gonzalez et al., "Adaptive Fastest Path Computation on a Road Network: A Traffic Mining Approach", ACM, In the Proceedings of the 33rd International Conference on Very Large Data Bases, Sep. 23-28, 2007, pp. 794-805, 12 pages.
Gonzalez et al., "Understanding Individual Human Mobility Patterns Supplementary Material", retrieved on Dec. 29, 2009 at http://www.barabasilab.com/pubs/CCNR-ALB-Publications/200806-05-Nature-MobilityPatterns/200806-05-Nature-MobilityPatterns-SuppMat13.pdf>>, Nature, vol. 453, 2008, pp. 779-782, 18 pages.
GPS Track Log Route Exchange Forum, retrieved at <http://www.gpsxchange.com/>, on Jan. 18, 2008, 4 pages.
Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aq1=&gs-sm=d&gs-up1=2870|6708|0|10|40|2|2|0|0|0|0|266|438|0.1.1|2|0&bav=on.2,or.r-gc.r-pw.,cf.osb&fp=533a712cc6ce8ba0&biw=1280&bih=808>>, 2008, 2 pages.
Greenfeld, "Matching GPS Observations to Locations on a Digital Map", Proceedings of the 81st Annual Meeting of the Transportation Research Board, Washington DC, Jan. 2002, 13 pages.
Guehnemann et al., "Monitoring Traffic and Emissions by Floating Car Data," Institute of Transport Studies Working Paper, Australia, 2004, retrieved at <<http://elib.dlr.de/6675/1/its-wp-04-07.pdf, 13 pages.
Gustavsen, "Condor—an Application Framework for Mobility-Based Context-Aware Applications", retrieved on Aug. 4, 2009 at <<http://www.comp.lancs.ac.uk/~dixa/conf/ubicomp2002-models/pdf/Gustaysen-goteborg%20sept-02.pdf>>, UBICOMP 2002, vol. 39, pp. 1-6, 6 pages.
Gutman, "Reach-Based Routing: A New Approach to Shortest Path Algorithms Optimized for Road Networks", Proceedings of the Sixth Workshop on Algorithm Engineering and Experiments and the First Workshop on Analytic Algorithmics and Combinatorics, New Orleans, LA, USA, Jan. 6, 2004, 12 pages.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0-AaCpICHDQ&usg=AFQjCNFtQttNVHCKYJQZcH052-KmCxlZ0g>>, ACM, Proceedings of Conference on Management of Data, 1984, pp. 47-57, 11 pages.
Hadjieleftheriou et al., "Efficient Indexing of Spatiotemporal Objects", Proceedings of the 8th International Conference on Extending Database Technology: Advances in Database Technology, Mar. 2002, pp. 251-268, 10 pages.
Han et al., "Predicting User's Movement with a Combination of Self-Organizing Map and Markov Model", ICANN 2006, Pat II, LNCS 4132, pp. 884-893, 10 pages.
Han et al., "Frequent Pattern Mining: Current Status and Future Directions", retrieved on Aug. 4, 2009 at <<http://www.springerlink.com/content/9p5633hm18x55867/fulltext.pdf>>, Springer Science+Business Media, LLC, vol. 14, No. 1, 2007, pp. 55-86, 32 pages.
Hariharan et al., "NetTrust—Recommendation System for Embedding Trust in a Virtual Realm", ACM Recommender Systems, Oct. 2007, 6 pages.
Hariharan et al., "Project Lachesis: Parsing and Modeling Location Histories", Proceedings of GIScience, ACM, 2004, pp. 106-124, 16 pages.
Hart et al., "A Formal Basis for the Heuristic Determination of Minimum Cost Paths", Proceedings of IEEE Transactions of Systems Science and Cybernetics, vol. 4, No. 2, Feb. 12, 2007 (First Publication 1968), pp. 100-107, 8 pages.
Hjaltason, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318, 42 pages.
Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129, 7 pages.
Huang et al., "Discovering Co-location Patterns from Spatial Datasets: A General Approach", retrieved on Dec. 29, 2009 at http://www.spatial.cs.umn.edu/paper-ps/coloc-tkde.pdf, IEEE Transactions on Knowledge and Data Engineering, vol. 16, Issue 12, Dec. 2004, pp. 1472-1485, 30 pages.
Ishi et al., "Head Motion During Dialogue Speech and Nod Timiong Control in Humanoid Robots", 5th ACM/IEEE International Conference on Human-Robot Interaction (HRI'10), Mar. 2010, pp. 293-300, 8 pages.
Jan et al., "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44, 12 pages.
Jing et al., "Hierarchical Optimization of Optimal Path Finding for Transportation Applications", (University of Michigan Research Paper, 1996, pp. 269-276), Proceedings of the Fifth International Conference on Information and Knowledge Management, 1996, pp. 261-268, 8 pages.
Kharrat et al., "Clustering Algorithm for Network Constraint Trajectories," 13 International Symposium on Spatial Data Handling, 2008, pp. 631-647, 17 pages.
Kim et al., "A Spatiotemporal Data and Indexing," Proceedings of IEEE Region 10 International Conference eon Electrical and Electronic Technology, Singapore, Aug. 19-22, 2001, pp. 110-113, 4 pages.
Klemmer et al., "Where Do Web Sites Come From? Capturing and Interacting with Design History," Proceedings CHI 2002, ACM Press, 2002, pp. 1-8, 8 pages.

(56) References Cited

OTHER PUBLICATIONS

Kollios et al., "Indexing Animated Objects Using Spatiotemporal Access Methods," IEEE Trans. Knowl. Data Eng. 13(4), 2001, pp. 758-777, 20 pages.

Kolovson et al., "Segment Indexes: Dynamic Indexing Techniques for Multi-Dimensional Interval Data," Proceedings of the ACM SIGMOD Conference on Management of Data, 1991, pp. 138-147, 10 pages.

Korn et al., "On the 'Dimensionality Curse' and the 'Self-Similarity Blessing'", retrieved on Apr. 15, 2010 at http://www.informedia.cs.cmu.edu/documents/korn-dimcurse-2001.pdf>>, IEEE Educational Activities Department, Transactions on Knowledge and Data Engineering, vol. 13, No. 1, Jan. 2001, pp. 96-111, 16 pages.

Kostakos et al., "Cityware: Urban Computing to Bridge Online and Real-world Social Networks," Handbook of Research on Urban Informatics: The Practice and Promise of the Real-Time City, 2008, 9 pages.

Krumm et al., "Predestination: Inferring Destinations from Partial Trajectories," Proc. of UBICOMP 2006, Springer-Verlag Press, pp. 243-260, 18 pages.

Krumm et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, pp. 4-13, 10 pages.

Krumm et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107, 4 pages.

Kumar et al., "Approximate Minimum Enclosing Balls in High Dimensions Using Core-sets," Journal of Experimental Algorithmics (JEA), vol. 8, No. 1.1, 2003, 29 pages.

Kumar et al., "Designing Access Methods for Bitemporal Databases," IEEE Trans. Knowl. Data Eng., vol. 10, No. 1, Jan./Feb. 1998, pp. 1-20, 20 pages.

Lafferty et al., "Conditional Random Fields: Probabilistic Models for Segmenting and Labeling Sequence Data", Proceedings of the 18th International Conference on Machine Learning, Jun. 2001, 8 pages.

Lee et al., "TraClass: Trajectory Classification Using Hierarchical Region-Based and Trajectory-Based Clustering", ACM, VLDB 2008, vol. 1, Issue. 1, 2008, pp. 1081-1094, 14 pages.

Lee et al., "Trajectory Outlier Detection: A Partition-and-Detect Framework", retrieved on Aug. 4, 2009 at <<http://www.cs.uiuc.edu/homes/hanj/pdf/icde08-jaegil-lee.pdf>>, IEEE Computer Society, ICDE 2008, 2008, pp. 1-10, 10 pages.

Lee et al., "Trajectory Clustering: A Partition-and-Group Framework", Proceedings of the 26th ACM SIGMOD International Conference on Management of Data 2007, pp. 593-604, 12 pages.

Lemire, "Slope One Predictors for Online Rating-Based Collaborative Filtering", retrieved on Dec. 29, 2009 at <<http://www.daniel-lemire.com/fr/documents/publications/lemiremaclachlan-sdm05.pdf>>, SIAM Proceedings of Data Mining (SDM), 2005, pp. 1-5, 5 pages.

Li et al., "Mining User Similarity Based on Location History", retrieved on Apr. 16, 2010 at <<http://research.microsoft.com/pubs/74369/Mining%20user%20similarity%20based%20on%20locaton%20history.pdf>>, ACM Conference on Advances in Geographic Information Systems (ACM GIS 2008), Irvine, California, Nov. 5-7, 2008, Article 34, 10 pages.

Li et al., "Traffic Density-Based Discovery of Hot Routes in Road Networks", Springer-Verlag, Advances in Spatial and Temporal Databases, 2007, pp. 441-459, 19 pages.

Liao et al., "Building Personal Maps from GPS Data," Annals of the New York Academy of Sciences, vol. 1093, Progress in Convergence: Technologies for Human Wellbeing, Dec. 2006, pp. 249-265, 17 pages.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, 6 pages.

Liao et al., "Learning and Inferring Transportation Routines", Elsevier, Artificial Intelligence, vol. 171, Issues 5-6, Apr. 2007, pp. 311-331, 21 pages.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages.

Liu et al., "Uncovering Cabdrivers' Behavior Patterns from their Digital Traces", Computers, Environment and Urban Systems, vol. 34, 2010, pp. 541-548, 8 pages.

Lou et al., "Map-Matching for Low-Sampling-Rate GPS Trajectories," Proceedings of the 17th ACM SIGSPATIAL International Conference on Advances in Geographic Information Systems, ACM, 2009, pp. 352-361, 10 pages.

Mamoulis et al., "Mining, Indexing, and Querying Historical Spatiotemporal Data", retrieved on Dec. 29, 2009 at http://i.cs.hku.hk/~nikos/sigkdd2004-1.pdf>>, ACM Proceedings of Conference on Knowledge Discovery and Data Mining (KDD), Aug. 22, 2004, pp. 236-245, 10 pages.

Manning et al., "An Introduction to Information Retrieval", DRAFT, Cambridge University Press, Apr. 1, 2009, retrieved on Apr. 16, 2010 at <<http://nlp.stanford.edu/IR-book/pdf/irbookonlinereading.pdf>>, 581 pages.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5, 5 pages.

Mitchell et al., "Six in the City: Introducing Real Tournament—A Mobile IPv6 Based Context-Aware Multiplayer Game", NetGames, May 22-23, 2003, Redwood City, California, pp. 91-100, 10 pages.

Miyaki et al., "Tracking Persons Using Particle Filter Fusing Visual and Wi-Fi Localizations for Widely Distributed Camera", IEEE Intl Conference on Image Processing, ICIP 2007, vol. 3, pp. 225-228, 4 pages.

Monreale et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=Guide&CFID=47499709&CFTOKEN=90308932>>, ACM, KDD 2009, pp. 637-645, 9 pages.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358, 6 pages.

Morse, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580, 12 pages.

Mountain Bike, retrieved at <http://www.mtb-tracks.co.uk/northyorkmoors/default.aspx> on Jan. 18, 2008, 2 pages.

Nascimento et al., "Towards Historical R-trees", Proc. of the ACM Symp. on Applied Computing, SAC, pp. 235-240, Feb. 1998, 6 pages.

Nascimento, "Evaluation of Access Structures for Discretely Moving Point," Proceedings of the International Workshop on Spatio-Temporal Database Management, Sep. 1, 1998, pp. 171-188, 18 pages.

Nicholson, "Finding the Shortest Route Between Two Points in a Network", British Computer Society, The Computer Journal, 1966, vol. 9, No. 3, pp. 275-280, 6 pages.

Nzouonta et al, "VANET Routing on City Roads using Real-Time Vehicular Traffic Information", IEEE Transactions on Vehicular Technology, vol. 58, No. 7, Sep. 2009, 18 pages.

Papadopoulos et al., "Performance of Nearest Neighbor Queries in R-Trees," Database Theory—ICDT, Springer Berlin Heidelberg, 1997, pp. 394-408, 15 pages.

(56) References Cited

OTHER PUBLICATIONS

Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>, 10 pages.
Patterson et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89, 18 pages.
Pfoser et al., "Capturing the Uncertainty of Moving-Object Representations", Springer-Verlag, Proceedings of the 6th International Symposium on Advances in Spatial Databases, Lecture Notes in Computer Science, 1999, vol. 1651, pp. 111-131, 21 pages.
Rao et al., "Making B+-tree Cache Sensitive in Main Memory," Proceedings of ACM SIGMOD Conference, 2000, pp. 475-486, 12 pages.
Rekimoto et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, pp. 35-49, 21 pages.
Rosenfeld, "Connectivity in Digital Pictures", Journal of the ACM 17 (1): pp. 146-160, 1970, 15 pages.
Roussopoulos et al., "Nearest Neighbor Queries," SIGMOD, 1995, pp. 71-79, 23 pages.
Salzberg et al., "Comparison of Access Methods for Time-Evolving Data," Commun. ACM 31(2), 1999, pp. 158-221, 64 pages.
Schofield, "It's GeoLife, Jim, But Not As We Know It", Guardian News, Retrieved on Nov. 28, 2011 at <<http://www.guardian.co.uk/technology/2008/mar/13/microsoft.research/print>>, Mar. 12, 2008, 2 pages.
Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behavior Research, Aug. 10-15, 2003, pp. 1-32, 34 pages.
Sellen et al., "Do Life-Logging Technologies Support Memory for the Past? An Experimental Study using SenseCam," Proc. of CHI 2007, ACM Press, pp. 1-8, 10 pages.
Shekhar et al., "A Unified Approach to Detecting Spatial Outliers", GeoInformatica, vol. 7, Issue 2, Jun. 2003, pp. 139-166, 28 pages.
Sherkat, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908, 13 pages.
Shiraishi, "A User-Centric Approach for Interactive Visualization and Mapping of Geo-Sensor Data", INSS '07, Fourth International Conference on Networked Sensing Systems, Jun. 1, 2007, pp. 134-137, 4 pages.
Shklovski et al., "Urban Computing-Navigating Space and Context," IEEE Computer Society. 39 ,9, pp. 36-37, 2006, 2 pages.
Simon et al., "A Mobile Application Framework for the Geospatial Web", ACM Proceedings of World Wide Web Conference (WWW), May 8, 2007, pp. 381-390, 10 pages.
Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>, 23 pages.
Slamxr, retrieved at <http://www.msslam.com/slamxr/slamxr.htm>, on Jan. 18, 2008, 2 pages.
Song et al., "Hashing Moving Objects," Proceedings of 2nd International Conference of Mobile Data Management, 2001, pp. 161-172, 31 pages.
Spinellis, "Position-Annotated Photographs: A Geotemporal Web", IEEE Pervasive Computing, vol. 2, No. 2, Apr. 1, 2003, pp. 72-79, 8 pages.
Srebro et al., "Weighted Low-Rank Approximations", Proceedings of the 20th International Conference on Machine Learning (ICML-2003), Washington, DC, Aug. 21-24, 2003, pp. 720-727, retrieved on Apr. 30, 2010 at <<http://people.scail.mit.edu/tommi/papers/SreJaa-icml03.pdf>>, 8 pages.
Strachan et al., "GPSTunes—Controlling Navigation Via Audio Feedback", Proceeding MobileHCI, Sep. 2005, Proceedings of the 7th International Conference on Human Computer Interaction with Mobile Devices & Services, 4 pages.
Sui, "Decision Support Systems Based on Knowledge Management", Services Systems and Services Management, Proceedings of ICSSSM '05, 2005 International Conference on Volume, vol. 2, pp. 1153-1156, 4 pages.
Sun, "Outlier Detection in High Dimensional, Spatial and Sequential Data Sets", School of Information Technologies, The University of Sydney, Thesis, Sep. 2006, 118 pages.
Tai et al., "Recommending Personalized Scenic Itinerary with Geo-Tagged Photos", ICME, 2008, 4 pages.
Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100, 10 pages.
Takeuchi et al., "City Voyager: An Outdoor Recommendation System Based on User Location History", Proceedings of the 3rd International Conference on Ubiquitous Intelligence and Computing (UIC 2006), Wuhan, China, Sep. 3-6, 2006, pp. 625-636, 12 pages.
Tao et al., "MV3R-Tree: A Spatio-Temporal Access Method for Timestamp and Interval Queries," Proceedings of the International Conference on Very Large Data Bases, 2001, pp. 431-440, 10 pages.
Tezuka et al., "Toward Tighter Integration of Web Search with a Geographic Information System", WWW, May 23-26, 2006, Edinburgh, Scotland, 10 pages.
Theodoridis et al., "Spatio-Temporal Indexing for Large Multimedia Applications", Proceedings of the IEEE International Conference on Multimedia Systems, Jun. 1996, 9 pages.
Theodoridis et al., "On the Generation of Spatiotemporal Datasets," Advances in Spatial Databases, 6th International Symposium, Lecture Notes in Computer Science, Springer, 1999, pp. 147-164, 19 pages.
Theodoridis et al., "Specifications for Efficient Indexing in Spatiotemporal Databases," Proceedings of the International Conference on Scientific and Statistical Database Management, pp. 123-132, Jul. 1-3, 1998, Capri, Italy, 10 pages.
Toyama et al., "Geographic Location Tags on Digital Images," Proc. of ACM Multimedia 2003, ACM Press, Nov. 2-8, 2003, Berkeley, California, pp. 156-166, 11 pages.
Vlachos et al., "Discovering Similar Multidimensional Trajectories", IEEE Computer Society, Proceedings of Conference on Data Engineering (ICDE), 2002, pp. 673-684, 12 pages.
Wang et al., "A Flexible Spatio-Temporal Indexing Scheme for Large-Scale GPS Track Retrieval," MDM '08 9th International Conference on Mobile Data Management, IEEE, Beijing, pp. 1-8, 8 pages.
Wang et al., "An Optimized Location-based Mobile Restaurant Recommend and Navigation System," WSEAS Transactions on Information Science and Applications, vol. 6, Issue 5, May 2009, pp. 809-818, 10 pages.
Wang et al., "Spatiotemporal Data Modelling and Management: A Survey," Proceedings 36th International Conference on Technology of Object-Oriented Languages and Systems, Oct. 30-Nov. 4, 2000, pp. 202-211, 10 pages.
Wang et al., "Unifying User-based and Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, 8 pages.

(56) References Cited

OTHER PUBLICATIONS

Wang et al., "CLOSET+: Searching for the Best Strategies for Mining Frequest Closed Itemsets", ACM, SIGKDD 2003, 2003, pp. 236-245, 10 pages.

Wasinger et al., "M3I in a Pedestrian Navigation & Exploration System", Proceedings of the Fifth International Symposium on Human Computer Interaction with Mobile Devices, Sep. 2003, 5 pages.

Wei et al., "A Service-Portlet Based Visual Paradigm for Personalized Convergence of Information Resources", 2nd IEEE International Conference on Computer Science and Information Technology, Aug. 2009, pp. 119-124, 6 pages.

Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.

Xiao et al., "Density Based Co-Location Pattern Discovery", ACM Proceedings of Conference on Advances in Geographic Information Systems (SIGSPATIAL), OLAP and Co-location Mining, Article 29, Nov. 5, 2008, pp. 1-10, 10 pages.

Yan et al., "Clospan: Mining Closed Sequential Patterns in Large Datasets", Proceedings of SIAM Int. Conference on Data Mining, SDM 2003, 2003, pp. 166-177, 12 pages.

Yan et al., "Discovery of Frequent Substructures", Wiley-Interscience, 2007, pp. 99-113, 17 pages.

Yavas et al., "A Data Mining Approach for Location Prediction in Mobile Environments", retrieved on Aug. 4, 2009 at <<http://www.cs.bilkent.edu.tr/~oulusoy/dke05.pdf>>, Elsevier B.V., 2004, pp. 121-146, 26 pages.

Ye et al., "Mining Individual Life Pattern Based on Location History," Tenth International Conference on Mobile Data Management: Systems, Services and Middleware, May 18-20, 2009, Taipei, 10 pages.

Yi et al., Efficient Retrieval of Similar Time Sequences under Time Warping, ICDE, 1998, pp. 201-208, 15 pages.

Yuan et al., "An Interactive-Voting Based Map Matching Algorithm," Proceedings of the 11$^{th}$ International IEEE Conference on Mobile Data Management (MDM), pp. 43-52, 2010, 10 pages.

Yuan et al., "Driving with Knowledge from the Physical World," Proceedings of the 17$^{th}$ ACM SIGKDD International Conference on Knowledge, Discovery and Data Mining, 2011, pp. 316-324, 9 pages.

Yuan et al., "T-Drive: Driving Directions Based on Taxi Trajectories," Proc. of ACM SIGSPATIAL GIS 2010, 10 pages.

Zhang et al., "Fast Mining of Spatial Collocations", ACM Proceedings of Conference on Knowledge Discovery and Data Mining (SIGKDD), Aug. 22, 2004, pp. 384-393, 10 pages.

Zhang et al., "Research on Information Fusion on Evaluation of Driver Fatigue", 2008 International Symposium on Computer Science and Computational Technology, Dec. 2008, pp. 151-155, 5 pages.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, vol. 10, pp. 236-241, 6 pages.

Notice of Allowance mailed Oct. 8, 2014 from U.S. Appl. No. 12/037,347, 8 pages.

Notice of Allowance mailed May 21, 2014 from U.S. Appl. No. 12/037,347, 8 pages.

Response filed Apr. 11, 2014 from U.S. Appl. No. 12/037,347, 12 pages.

Non-Final Office Action mailed Jan. 13, 2014 from U.S. Appl. No. 12/037,347, 9 pages.

Response filed Dec. 3, 2013 from U.S. Appl. No. 12/037,347, 13 pages.

Notice of Allowance mailed Sep. 3, 2013 from U.S. Appl. No. 12/037,347, 9 pages.

Notice of Allowance mailed Mar. 14, 2013 from U.S. Appl. No. 12/037,347, 8 pages.

Notice of Allowance mailed Nov. 29, 2012 from U.S. Appl. No. 12/037,347, 9 pages.

Response filed Dec. 19, 2011 from U.S. Appl. No. 12/037,347, 16 pages.

Final Office Action mailed Aug. 17, 2011 from U.S. Appl. No. 12/037,347, 9 pages.

Response filed Jun. 1, 2011 from U.S. Appl. No. 12/037,347, 33 pages.

Non-Final Office Action mailed Mar. 1, 2011 from U.S. Appl. No. 12/037,347, 18 pages.

International Search Report mailed Sep. 15, 2009 from PCT Patent Application No. PCT/US2009/032774, 3 pages.

Written Opinion mailed Sep. 15, 2009 from PCT Patent Application No. PCT/US2009/032774, 4 pages.

International Preliminary Report on Patentability mailed Aug. 31, 2010 from PCT Patent Application No. PCT/US2009/032774, 5 pages.

Extended European Search Report mailed Nov. 21, 2012 from European Patent Application No. 09714738.3, 9 pages.

Response filed Jun. 3, 2013 from European Patent Application No. 09714738.3, 20 pages.

Notice of Allowance mailed Jan. 6, 2011 from U.S. Appl. No. 12/037,305, 8 pages.

Preliminary Amendment filed Apr. 6, 2011 in Response to Notice of Allowance filed mailed Jan. 6, 2011 from U.S. Appl. No. 12/037,305, 9 pages.

Notice of Allowance mailed Apr. 27, 2011 from U.S. Appl. No. 12/037,305, 8 pages.

International Search Report and Written Opinion mailed Aug. 26, 2009 from PCT Patent Application No. PCT/US2009/032777, 6 pages.

International Preliminary Report on Patentability mailed Aug. 31, 2010 from PCT Patent Application No. PCT/US2009/032777, 4 pages.

Response filed Jan. 7, 2013 from European Patent Application No. 09715263.1, 20 pages.

Extended European Search Report mailed Jun. 8, 2012 from European Patent Application No. 09715263.1, 6 pages.

Response filed Jun. 26, 2015 from European Patent Application No. 09715263.1, 13 pages.

Notice of Allowance mailed Jul. 11, 2012 from U.S. Appl. No. 13/195,496, 5 pages.

Response and Terminal Disclaimer filed Jun. 7, 2012 from U.S. Appl. No. 13/195,496, 12 pages.

Non-Final Office Action mailed Feb. 7, 2012 from U.S. Appl. No. 13/195,496, 7 pages.

Response filed Jan. 23, 2012 from U.S. Appl. No. 13/195,496, 8 pages.

Non-Final Office Action mailed Oct. 21, 2011 from U.S. Appl. No. 13/195,496, 7 pages.

Zheng et al., "Collaborative Location and Activity Recommendations with GPS History Data," Proceedings of the 19th International Conference on World Wide Web, 2010, pp. 1029-1038, 6 pages.

Zheng et al., "Cross-domain Activity Recognition," Proceedings of the 11th International Conference on Ubiquitous Computing, Orlando, USA, 2009, ACM Press, pp. 61-70, 10 pages.

Zheng et al., "Drive Smartly as a Taxi Driver," 2010 7th International Conference on Ubiquitous Intelligence & Computing and 7th International Conference on Autonomic & Trusted Computing (UIC/ATC), Oct. 26-29, 2010, pp. 484-486, 3 pages.

Zheng et al., "GeoLife: A Collaborative Social Networking Service Among User, Location and Trajectory," IEEE Data Engineering Bulletin, 33(2), 2010, pp. 32-40, 8 pages.

Zheng et al., "GeoLife: Managing and Understanding your Past Life over Maps", IEEE Computer Society, Proceedings of the 9$^{th}$ International Conference on Mobile Data Management, 2008, pp. 211-212, 2 pages.

Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, 2 pages.

(56) References Cited

OTHER PUBLICATIONS

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, 4 pages.
Zheng et al., "Learning Transportation Mode from Raw GPS Data for Geographic Applications on the Web", Proceedings of the 17th International Conference on World Wide Web, Apr. 21-25, 2008, Beijing, China, pp. 247-256, 10 pages.
Zheng et al., "Microsoft GeoLife Project, GeoLife: Building Social Networks Using Human Location History", Microsoft Research, 2009, retrieved on Apr. 16, 2010 at <<http://research.microsoft.com/en-us/projects/geolife/default.aspx>>, 4 pages.
Zheng et al., "Mining Correlation Between Locations Using Human Location History," Proceedings of the 17th ACM SIGSPATIAL International Conference on Advances in Geographic Information Systems, 2009, pp. 472-475, 4 pages.
Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, 10 pages.
Zheng et al., "Recommending Friends and Locations Based on Individual Location History", ACM Trans. Asian Language Information Processing, vol. 6, No. 3, Article 9, Ch. 45, Nov. 2007, 47 pages.
Zheng et al., "Recommending Friends and Locations Based on Individual Location History," ACM Trans. on the Web, 5, 1 (2011), pp. 1-44, 44 pages.
Zheng et al., "Searching Your Life on Web Maps", Microsoft Research, Available at <<http://research.microsoft.com/en-us/people/yuzheng/searching-your-life-over-web-maps.pdf>>, 2008, 4 pages.
Zheng et al., "T-Drive: Driving Directions based on Taxi Trajectories," Proceedings of ACM SIGSPATIAL GIS 2010, ACM Press, 2010, pp. 99-108, 10 pages.
Zheng et al., "Understanding Mobility Based on GPS Data", ACM Proceedings of Conference on Ubiquitous Computing (UbiComp), vol. 344, Sep. 21, 2008, pp. 312-321, 10 pages.
Zheng et al., "Understanding Transportation Modes Based on GPS Data for Web Applications," ACM Transactions on the Web (TWEB), 2010, 4(1), pp. 1-36, 36 pages.
Zheng et al., "Urban Computing with Taxicabs," Proceedings of the 13th International Conference on Ubiquitous Computing, UbiComp, 2011, pp. 89-98, 10 pages.
Zhou et al., "Close Pair Queries in Moving Object Databases," Proceedings of ACM GIS, pp. 2-11, 2005, 10 pages.
Ziebart et al., "Navigate Like a Cabbie: Probabilistic Reasoning from Observed Context-Aware Behavior," Proc. Ubicomp 2008, Sep. 21-24, 2008, Seoul, Korea, pp. 322-331, 10 pages.
Notice of Allowance mailed Sep. 6, 2011 from U.S. Appl. No. 12/037,263, 9 pages.
Response filed Jun. 24, 2011 from U.S. Appl. No. 12/037,263, 8 pages.
Non-Final Office Action mailed Mar. 29, 2011 from U.S. Appl. No. 12/037,263, 8 pages.
Response filed Jan. 10, 2011 from U.S. Appl. No. 12/037,263, 12 pages.
Non-Final Office Action mailed Oct. 8, 2010 from U.S. Appl. No. 12/037,263, 7 pages.
International Search Report mailed Aug. 19, 2009 from PCT Patent Application No. PCT/US2009/032778, 3 pages.
Written Opinion mailed Aug. 19, 2009 from PCT Patent Application No. PCT/US2009/032778, 4 pages.
International Preliminary Report on Patentability mailed Aug. 31, 2010 from PCT Patent Application No. PCT/US2009/032778, 5 pages.
Extended European Search Report mailed Jul. 17, 2012 from European Patent Application No. 09713700.4, 9 pages.
Response filed Nov. 8, 2012 from European Patent Application No. 0971370034, 12 pages.
Non-Final Office Action mailed Dec. 8, 2011 from U.S. Appl. No. 12/562,588, 31 pages.
Response filed Apr. 9, 2012 to Non-Final Office Action mailed Dec. 8, 2011 from U.S. Appl. No. 12/562,588, 23 pages.
Notice of Allowance mailed May 25, 2012 from U.S. Appl. No. 12/562,588, 17 pages.
Preliminary Amendment filed Feb. 23, 2010 from U.S. Appl. No. 12/711,130, 64 pages.
Notice to File Corrected Application Papers mailed Mar. 11, 2010 from U.S. Appl. No. 12/711,130, 2 pages.
Response to Notice to File Corrected Application Papers filed Mar. 12, 2010 from U.S. Appl. No. 12/711,130, 97 pages.
Notice of Incomplete Reply mailed Mar. 22, 2010 from U.S. Appl. No. 12/711,130, 5 pages.
Response to Notice of Incomplete Reply filed May 11, 2010 from U.S. Appl. No. 12/711,130, 75 pages.
Non-Final Office Action mailed Mar. 27, 2012 from U.S. Appl. No. 12/711,130, 14 pages.
Applicant Initiated Interview Summary mailed Jul. 3, 2012 from U.S. Appl. No. 12/711,130, 3 pages.
Response filed Jul. 27, 2012 to Non-Final Office Action mailed Mar. 27, 2012 from U.S. Appl. No. 12/711,130, 27 pages.
Final Office Action mailed Oct. 4, 2012 from U.S. Appl. No. 12/711,130, 15 pages.
Response filed Dec. 28, 2012 to Final Office Action mailed Oct. 4, 2012 from U.S. Appl. No. 12/711,130, 23 pages.
Terminal Disclaimer filed Jul. 17, 2013 from U.S. Appl. No. 12/711,130, 1 pages.
Notice of Allowance mailed Jul. 31, 2013 from U.S. Appl. No. 12/711,130, 8 pages.
Non-Final Office Action mailed Aug. 15, 2012 from U.S. Appl. No. 12/712,053, 17 pages.
Response filed Dec. 27, 2012 to Non-Final Office Action mailed Aug. 15, 2012 from U.S. Appl. No. 12/712,053, 25 pages.
Non-Final Office Action Jun. 6, 2014 from U.S. Appl. No. 12/712,053, 25 pages.
Response filed Sep. 30, 2014 to Non-Final Office Action mailed Jun. 6, 2014 from U.S. Appl. No. 12/712,053, 34 pages.
Final Office Action mailed Mar. 10, 2015 from U.S. Appl. No. 12/712,053, 23 pages.
Response filed Jun. 1, 2015 to Final Office Action mailed Mar. 10, 2015 from U.S. Appl. No. 12/712,053, 32 pages.
Notice of Allowance mailed Oct. 7, 2015 from U.S. Appl. No. 12/712,053, 5 pages.
Non-Final Office Action mailed Aug. 5, 2013 from U.S. Appl. No. 12/712,857, 16 pages.
Response filed Oct. 3, 2013 to Non-Final Office Action mailed Aug. 5, 2013 from U.S. Appl. No. 12/712,857, 12 pages.
Final Office Action mailed Feb. 21, 2014 from U.S. Appl. No. 12/712,857, 15 pages.
Response filed Mar. 31, 2014 to Final Office Action mailed Feb. 21, 2014 from U.S. Appl. No. 12/712,857, 13 pages.
Advisory Action mailed Apr. 8, 2014 from U.S. Appl. No. 12/712,857, 3 pages.
Non-Final Office Action mailed Jun. 6, 2014 from U.S. Appl. No. 12/712,857, 14 pages.
Response filed Sep. 8, 2014 to Non-Final Office Action mailed Jun. 6, 2014 from U.S. Appl. No. 12/712,857, 14 pages.
Final Office Action mailed Jan. 6, 2015 from U.S. Appl. No. 12/712,857, 15 pages.
Response filed Mar. 25, 2015 to Final Office Action mailed Jan. 6, 2015 from U.S. Appl. No. 12/712,857, 14 pages.
Non-Final Office Action mailed Jun. 25, 2015 from U.S. Appl. No. 12/712,857, 18 pages.
Response filed Sep. 23, 2015 to Non-Final Office Action mailed Jun. 25, 2015 from U.S. Appl. No. 12/712,857, 16 pages.
Final Office Action mailed Oct. 7, 2015 from U.S. Appl. No. 12/712,857, 18 pages.
Applicant Initiated Interview Summary mailed Nov. 13, 2015 from U.S. Appl. No. 12/712,857, 3 pages.
Restriction Requirement mailed Aug. 17, 2012 from U.S. Appl. No. 12/794,538, 7 pages.

(56) References Cited

OTHER PUBLICATIONS

Response filed Sep. 17, 2012 to Restriction Requirement mailed Aug. 17, 2012 from U.S. Appl. No. 12/794,538, 4 pages.
Non-Final Office Action mailed Nov. 29, 2012 from U.S. Appl. No. 12/794,538, 10 pages.
Response filed Apr. 19, 2013 to Non-Final Office Action mailed Nov. 29, 2012 from U.S. Appl. No. 12/794,538, 15 pages.
Final Office Action mailed Sep. 18, 2013 from U.S. Appl. No. 12/794,538, 12 pages.
Response filed Oct. 22, 2013 to Final Office Action mailed Sep. 18, 2013 from U.S. Appl. No. 12/794,538, 13 pages.
Non-Final Office Action mailed Nov. 25, 2013 from U.S. Appl. No. 12/794,538, 19 pages.
Response filed Jan. 8, 2014 to Non-Final Office Action mailed Nov. 25, 2013 from U.S. Appl. No. 12/794,538, 20 pages.
Final Office Action mailed Apr. 22, 2014 from U.S. Appl. No. 12/794,538, 38 pages.
Response filed May 9, 2014 to Final Office Action mailed Apr. 22, 2014 from U.S. Appl. No. 12/794,538, 20 pages.
Advisory Action mailed Jun. 2, 2014 from U.S. Appl. No. 12/794,538, 3 pages.
Non-Final Office Action mailed Mar. 23, 2015 from U.S. Appl. No. 12/794,538, 8 pages.
Response filed Jun. 22, 2015 to Non-Final Office Action mailed Jun. 22, 2015 from U.S. Appl. No. 12/794,538, 32 pages.
Final Office Action mailed Aug. 14, 2015 from U.S. Appl. No. 12/794,538, 10 pages.
Response filed Nov. 13, 2015 to Final Office Action mailed Aug. 14, 2015 from U.S. Appl. No. 12/794,538, 33 pages.
Applicant Initiated Interview Summary mailed Nov. 19, 2015 from U.S. Appl. No. 12/794,538, 3 pages.
Non-Final Office Action mailed Mar. 26, 2012 from U.S. Appl. No. 12/773,771, 9 pages.
Notice of Allowance and Examiner's Amendment mailed Jun. 13, 2012 from U.S. Appl. No. 12/773,771, 17 pages.
Notice of Allowance and Examiner's Amendment mailed Sep. 10, 2012 from U.S. Appl. No. 12/773,771, 16 pages.
Notice of Allowance and Examiner's Amendment mailed Nov. 2, 2012 from U.S. Appl. No. 12/773,771, 17 pages.
Notice of Allowance and Examiner's Amendment mailed Feb. 12, 2013 from U.S. Appl. No. 12/773,771, 17 pages.
Notice of Allowance mailed Jun. 6, 2013 from U.S. Appl. No. 12/773,771, 9 pages.
Notice of Allowance mailed Nov. 12, 2013 from U.S. Appl. No. 12/773,771, 10 pages.
Non-Final Office Action mailed Jan. 18, 2013 from U.S. Appl. No. 13/324,758, 48 pages.
Response filed Apr. 18, 2013 from U.S. Appl. No. 13/324,758, 20 pages.
Final Office Action mailed Jul. 11, 2013 from U.S. Appl. No. 13/324,758, 47 pages.
Response filed Aug. 21, 2013 from U.S. Appl. No. 13/324,758, 20 pages.
Non-Final Office Action mailed Dec. 24, 2014 from U.S. Appl. No. 13/324,758, 54 pages.
Applicant Initiated Interview Summary mailed Mar. 3, 2015 from U.S. Appl. No. 13/324,758, 3 pages.
Response filed Mar. 24, 2015 to Non-Final Office Action mailed Dec. 24, 2014 from U.S. Appl. No. 13/324,758, 26 pages.
Final Office Action mailed Jun. 17, 2015 from U.S. Appl. No. 13/324,758, 39 pages.
Response filed Sep. 17, 2015 to Final Office Action mailed Jun. 17, 2015 from U.S. Appl. No. 13/324,758, 28 pages.
Office Action mailed Oct. 9, 2015 from European Patent Application No. 09715263.1, 3 pages.
Response filed Nov. 24, 2015 to the Office Action mailed Oct. 9, 2015 from European Patent Application No. 09715263.1, 29 pages.
Schwartz, "Guidelines for Bias-Free Writing and Task Force on Bias-Free Language," Indiana University Press, Bloomington, IN, Feb. 1, 1995, 112 pages.

Borzsonyi et al., "The Skyline Operator," Proceedings of the 17th ICDE 2001, IEEE Press, Apr. 2-6, 2001, Heidelberg, pp. 421-430, 10 pages.
Hadjieleftheriou et al., "Indexing Spatialtemporal Archives," The VLDB Journal, vol. 15, No. 2, 2006, pp. 143-164, 22 pages.
Kindberg et al., "Guest Editors' Introduction: Urban Computing," Pervasive Computing, IEEE Computer Society, vol. 6, Issue 3, Aug. 2007, pp. 18-20, 3 pages.
Song et al., "SEB-tree: An Approach to Index Continuously Moving Objects," Proceedings of International Conference of Mobile Data Management, Springer Berlin Heidelberg, Jan. 2003, pp. 340-344, 5 pages.
Xie et al., "GeoLife: Building social networks using human history", Sep. 29, 2009 version, retrieved on Dec. 18, 2015 at http://research.microsoft.com/en-us/projects/geolife/>>, Microsoft Corporation, 4 pages.
Sohn et al., "Mobility Detection Using Everyday GSM Traces", retrieved on Aug. 4, 2009 at <<http://www.placelab.org/publications/pubs/mobility-ubicomp2006.pdf>>, UBICOMP 2006, pp. 212-224, 14 pages.
Sun, Pei and Sanjay Chawla, "On Local Spatial Outliers", Technical Report No. 549, Jun. 2004, retrieved at <<http://sydney.edu.au/engineering/it/ research/tr/tr549.pdf>>, 9 pages.
Tsoukatos, Ilias and Dimitrios Gunopulos, "Efficient Mining of Spatiotemporal Patterns", Proceedings of the 7th International Symposium on Spatial and Temporal Databases LNCS 2121, Redondo Beach, CA, Jul. 12-15, 2001, pp. 425-442, 18 pages.
Weng et al., "Design and Implementation of Spatial Temporal Data Model in Vehicle Monitor System", retrieved at <<http://www.geocomputation.org/2005/Weng.pdf>>, Proceedings of the 8th International Conference on GeoComputation, Jul. 31-Aug. 3, 2005, 8 pages.
Wikipedia, "Operating System", retrieved from <<http://en.wikipedia.org/wiki/Operating-system>> on Oct. 8, 2010, 1 page.
Winograd, Terry, "Dynamic Cartograms for Navigating Geo-referenced Photographs", available at least as early as Nov. 16, 2007, retrieved at <<http://cs.stanford.edu/research/project.php?id=289>>, on Nov. 19, 2007, 2 pages.
Wu et al., "Spatio-Temporal Outlier Detection in Precipitation Data", Knowledge Discovery from Sensor Data, retrieved at <<http://sydney.edu.au/engineering/it/ewu1/publications/WuLiuChawlaSensorKDD2008.pdf>>, 2010, pp. 115-133, 20 pages.
Xie, Xing, "Understanding User Behavior Geospatially", Microsoft Research, Nov. 2008, retrieved at <<http://drops.dagstuhl.de/volltexte/2009/2017/pdf/08251.XieXing.ExtAbstract.2017.pdf>>, 2 pages.
Xue, Feng, "Efficient Similarity Search in Sequence Database", retrieved on Apr. 15, 2010 at <<http://www.cs.uwaterloo.ca/ david/848/presentation-similarity-fengxue.pdf>>, University of Waterloo, Ontario Canada, Course Paper: CS 860 Topics in Database Systems, Nov. 18, 2009, 7 pages.
Yan, et al., "Feature-based Similarity Search in Graph Structures", ACM Translations on Database Systems, vol. V, No. N, Jun. 2006, 36 pages.
Yegulalp, Serdar, "Change the Windows 2000 DNS cache", published Aug. 21, 2002, retrieved on Apr. 29, 2008 at <<http://searchwincomputing.techtarget.com/tip/0,289483,sid68-gci1039955,00.html>>, SearchWinComputing.com, 3 pages.
Zhang et al., "Mining Non-Redundant High Order Correlations in Binary Data", International Conference on Very Large Data Bases (VLDB), Aukland, NZ, Aug. 23-28, 2008, pp. 1178-1188, 11 pages.
Zhang et al., "iBAT: Detecting Anomalous Taxi Trajectories from GPS Traces", Proceedings of UbiComp, Sep. 17-21, 2011, 10 pages.
Zhao, Zheng and Huan Liu, "Searching for Interacting Features", Proceedings of the 20th International Joint Conference on Artificial Intelligence, Hyderabad, India, Jan. 6-12, 2007, pp. 1156-1161, 6 pages.
"North York Moors and Yorkshire Wolds Mountain Bike (MTB) Routes", retrieved on Jan. 17, 2008 from <<http://www.mtb-routs.co.uk/northyorkmorrs/defaultaspx>>, 2006, 4 pages.

(56) References Cited

OTHER PUBLICATIONS

Kuhne et al., "New Approaches for Traffic Management in Metropolitan Areas", In 10th IFAC Symposium on Control in Transportation Systems, Aug. 4-6, 2003, 9 pages.
"Lifelog (DARPA)", retrieved at <<http://www.darpa.mil/ipto/programs/lifelog/index.htm>>, publication date: unknown, 1 page, date unknown.
Wikipedia, "Nokia Lifeblog", retrieved at <<https://en.wikipedia.org/wiki/Nokia_Lifeblog, on Feb. 26, 2008, 2 pages.
Hanlon, Mike, "Nokia Lifeblog is an automated multimedia diary," retrieved at <<http://www.gizmag.com/go/2729/>>, Jun. 4, 2004, 5 pages.
Blandford, Rafe, "Looking at Lifeblog," retrieved at <<http://www.allaboutsymbian.com/features/item/Looking_at_Lifeblog.php>>, Oct. 18, 2004, 14 pages.
Mead, Nick, "Lifeblog 2.5," retrieved at <<http://lifeblog.en.softonic.com/symbian>>, Feb. 25, 2008, 2 pages.
Wikipedia, "DARPA LifeLog," retrieved at <<https://en.wikipedia.org/wiki/DARPA_LifeLog>>, Dec. 14, 2013, 1 page.
Shachtman, Noah, "Pentagon Kills Lifelog Project," retrieved at <<http://www.wired.com/2004/02/pentagon-kills-lifelog-project/>>, Wired, Feb. 4, 2004, 6 pages.
Shachtman, Noah, "A Spy Machine of DARPA's Dreams," retrieved at <<http://archive.wired.com/techbiz/media/news/2003/05/58909?currentPage=all>>, Wired, May 20, 2003, 1 page.
Geek Magazine, "LifeLog: DARPA looking to record lives of interested parties," retrieved at <<http://www.geek.com/news/lifelog-darpa-looking-to-record-lives-of-interested-parties-5528791/>>, retrieved on Sep. 23, 2013, published on Jun. 3, 2003, 4 pages.
Weeks, Darren, "LifeLog: Because Big Brother Cares What You're Thinking," retrieved at <<http://www.sweetliberty.org/issues/privacy/lifelog.htm>> on Dec. 3, 2005, Big Brother, 5 pages.
"Flow Control Platform (FCP) Solutions", retrieved at <<http://k2colocation.com/network-services/fcp.cfm>>, K2 Colocation, 2005, 3 pages.
"Global Server Load Balancing for disaster recovery, business continuity, performance optimization and datacenter management", retrieved at <<http://www.zeus.com/documents/en/ZXT/ZXTM-Global-Load-Balancer.pdf>>, Zeus Technology Limited, 1995-2007, 4 pages.
"GPS-Waypoints", retrieved on Apr. 15, 2010 at <<http://www.gps-waypoints.net/>>, 2010, 2 pages.
"Share My Routes", retrieved on Apr. 15, 2010 at <<http://www.sharemyroutes.com/>>, 2010, 2 pages.
Allen, Anita L., "Dredging-up the Past: Lifelogging, Memory and Surveillance", University of Pennsylvania Law School, 2007, Paper 173, 50 pages.
Amato et al., "Region Based Image Similarity Search Inspired by Text Search", Third Italian Research Conference on Digital Library Systems, Padova, Italy, Jan. 29-30, 2007, pp. 78-85, 8 pages.
Brauckhoff et al., "Applying PCA for Traffic Anomaly Detection: Problems and Solutions", IEEE, 2009, 5 pages.
Breiman, Leo, "Bagging Predictors", Machine Learning, 1996 Kluwer Academic Publishers, Boston, vol. 24, pp. 123-140, 18 pages.
Brkic et al., "Generative modeling of spatio-temporal traffic sign trajectories", Proceedings of the IEEE Conference on Computer Vision and Pattern Recognition, 2010, pp. 25-31, 7 pages.
Bu et al., "Efficient Anomaly Monitoring Over Moving Object Trajectory Streams", Proceedings of the 15th ACM SIGKDD International Conference on Knowledge Discovery and Data Mining, Jun. 28, 2009, ACM, pp. 159-168, 9 pages.
Chawathe, Sudarshan S., "Segment-Based Map Matching", Proceedings of the IEEE Intelligent Vehicles Symposium, Jun. 13-15, 2007, pp. 1190-1197, 8 pages.
Chen et al., "GLS-SOD: A Generalized Local Statistical Approach for Spatial Outlier Detection", Proceedings of KDD 2010, ACM, Jul. 25-28, 2010, pp. 1069-1078, 10 pages.

Das, Mahashweta and Srinivasan Parthasarthy, "Anomaly Detection and Spatial-Temporal Analysis of Global Climate System", Proceedings of SensorKDD 2009, Jun. 28, 2009, 9 pages.
Datta et al., "Image Retrieval: Ideas, Influences, and Trends of the New Age", ACM Computing Surveys, vol. 40, No. 2, Article 5, Apr. 2008, pp. 1-60, 60 pages.
Deerwester et al., "Indexing by Latent Semantic Analysis", Journal American Society Information Science, vol. 41, No. 6, Jan. 1990, 34 pages.
"Domain Name System (DNS) A Guide to TCP/IP", Thomson Learning Course Technology, retrieved on Apr. 29, 2008, 56 pages.
"8.10 Domain Name System (DNS)", retrieved on Apr. 29, 2008 at <<http://www.unix.org.ua/orelly/networking/firewall/ch08-10.htm>>, Unix, 11 pages.
Dubuisson, Marie-Pierre and Anil K. Jain, "A Modified Hausdorff Distance for Object Matching", Proceedings of the 12th IAPR International Conference on Pattern Recognition, Computer Vision & Image Processing, vol. 1, Oct. 9-13, 1994, pp. 566-568, 3 pages.
Espinoza et al, "GeoNotes: Social and Navigational Aspects of Location-Based Information Systems", Proceedings of the Ubicomp 3rd International Conference on Ubiquitous Computing, Oct. 2001, LNCS 2201, 16 pages.
Estkowski, Regina, "No Steiner Point Subdivision Simplification is NP-Complete", Proceedings of the 10th Canadian Conference on Computational Geometry, 1998, pp. 11-20, 10 pages.
Eustice et al, "The Smart Party: A Personalized Location-aware Multimedia Experience", Consumer communications and Networking Conference, Jan. 2008, 5 pages.
Ge et al., "Top-Eye: Top-k Evolving Trajectory Outlier Detection", Proceedings of CIKM 2010, Toronto, Canada, Oct. 26-30, 2010, 4 pages.
"GPS Sharing", retrieved on Feb. 4, 2013 at <<http://web.archive.org/web/20071129224158/http://gpssharing.com, 2 pages.
Hadjieleftheriou et al., "Complex Spatio-Temporal Pattern Queries", Proceedings of the 31st VLDB Conference, Sep. 2005, pp. 877-888, 12 pages.
Hirose et al., "Network Anomaly Detection based on Eigen Equation Compression", Proceedings of the 15th SIGKDD Conference on Knowledge Discovery and Data Mining, ACM, 2009, pp. 1185-1194, 9 pages.
Huang, Shan and Jisu Oh, "Project Report (draft version) Spatial Outlier Detection", retrieved on Dec. 12, 2008 at <<http://www-users.cs.umn.edujoh/csci8715/P6.pdf>>, Computer Science Department, University of Minnesota, Apr. 12, 2004, 8 pages.
Jarvelin, Kalervo and Jaana Kekalainen, "Cumulated Gain Based Evaluation of IR Techniques", ACM Transactions on Information Systems, vol. 20, No. 4, Oct. 2002, 25 pages.
Jones, Quentin and Sukeshini A. Grandhi, "P3 Systems: Putting the Place Back into Social Networks", IEEE Internet Computing, Sep.-Oct. 2005, 9 pages.
Kanoulas et al., "Finding Fastest Paths on a Road Network with Speed Patterns", IEEE Computer Society, Proceedings of Conference on Data Engineering (ICDE), 2006, 10 pages.
Kavouras, Marinos and Margarita Kokla, "A Method for the Formalization and Integration of Geographic categorizations", Draft version from the International Journal of Geographic Information Science, vol. 16, No. 5, 2002, pp. 439-453, 25 pages.
Ke et al., "Correlated Pattern Mining in Quantitative Databases", ACM Transactions on Database Systems, vol. V, No. N, Apr. 2008, 44 pages.
Ke et al., "Efficient Correlations Search from Graph Databases", IEEE Transactions on Knowledge and Data Engineenng, vol. 20, Issue 12, Dec. 2008, pp. 1601-1615, 14 pages.
Kou et al., "Spatial Weighted Outlier Detection", retrieved on Dec. 12, 2008 at <<http://www.siam.org/proceedings/datamining/2006/dm06-072kouy.pdf>>, SIAM Conference on Data Mining, 2006, pp. 614-618, 5 pages.
Lakhina et al., "Diagnosing Network-Wide Traffic Anomalies", Proceedings of the SIGCOMM 2004 Conference, Feb. 19, 2004, 12 pages, 2004 ACM, 24 pages.

(56) References Cited

OTHER PUBLICATIONS

Lavondes et al., "Geo: PostalAddress—Country-specific postal address parsing/formatting", retrieved on Dec. 16, 2008 at <<http://search.cpan.org/pauamma/Geo-Postal Address-0.04/PostalAddress.pm>>, CPAN, 2004, 8 pages.

Lee et al, "Efficient Mining of User Behaviors by Temporal Mobile Access Patterns", International Journal of Computer Science and Network Security, vol. 7, No. 2, Feb. 2007, 7 pages.

Li et al., "A Connectivity-Based Map Matching Algorithm", AARS, Asian Journal of Geoinformatics, 2005, vol. 5, No. 3, pp. 69-76, 8 pages.

Li et al., "Temporal Outlier Detection in Vehicle Traffic Data", Proceedings of the 2009 IEEE International Conference on Data Engineering, pp. 1319-1322, 4 pages.

Liao et al., "Anomaly Detection in GPS Data Based on Visual Analytics", Proceedings of the 2010 IEEE Symposium, Oct. 2010, pp. 51-58, 8 pages.

Linden et al, "Amazon.com Recommendations, Item to Item Collaborative Filtering", IEEE Internet Computing, Jan. and Feb. 2003, 5 pages.

Linden, Greg, "Geeking with Greg: The End of Federated Search?", retrieved at <<http://glinden.blogspot.com/2007/03/end-of-federated-search.html>>, published on Mar. 24, 2007, 7 pages.

Lippi et al., "Collective Traffic Forecasting", Proceedings of the European Conference on Machine Learning and Principles and Practice of Knowledge Discovery Database, ECML PKDD 2010, pp. 259-273, 15 pages.

Lozano et al., "Spatial-temporal Causal Modeling for Climate Change Attribution", KDD 2009, Paris France, ACM Jun. 28-Jul. 1, 2009, 10 pages.

Markowetz et al., "Design and Implementation of a Geographic Search Engine", Eighth International Workshop on the Web Databases (WebDB 2005), Baltimore, MD, Jun. 16-17, 2005, 6 pages.

Masoud et al., "Fast Algorithms for Outlier Detection", retrieved on Dec. 12, 2008 at <<http://www.scipub.org/fulltext/jcs/ jcs42129-132.pdf>>, Journal of Computer Science, vol. 4, No. 2, 2008, pp. 129-132, 4 pages.

Matsuo et al, "Inferring Long-term User Properties based on Users' Location History", Proceedings of the 20th International Joint Conference on Artificial Intelligence, Jan. 2007, 7 pages.

McDonald, David W. and Mark S. Ackerman, "Expertise Recommender: A Flexible Recommendation System and Architecture", CSCW 2000, Dec. 2-6, 2000, 10 pages.

McKeown et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carlo 8 Conference Proceedings (ASPRS and ACSM), 1987, pp. 754-763, 10 pages.

Michael et al, "Location Based Intelligence—Modeling Behavior in Humans using GPS", Proceedings of the International Symposium on Technology and Society, Jun. 2006, 8 pages.

Min-Qi et al., "An Algorithm for Spatial Outlier Detection Based on Delaunay Triangulation", Proceedings of the 2008 International Conference on Computational Intelligence and Security, 2008, pp. 102-107, 6 pages.

Park et al., "CoDNS: Improving DNS Performance and Reliability via Cooperative Lookups," retrieved at <<http://www.cs.princeton.edu/nsg/papers/codns-osdi-04/paper.pdf, Princeton University, 2004, 16 pages.

Pelekis et al., "Unsupervised Trajectory Sampling", Proceedings of the European Conference on Machine Learning and Principles and Practice of Knowledge Discovery in Databases ECML PKDD 2010, pp. 17-33, 2010, 17 pages.

Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406, 12 pages.

Popivanov, Ivan and Renee J. Miller, "Similarity Search Over Time-Series Data Using Wavelets", Proceedings of the 18th International Conference on Data Engineering (ICDE'02), IEEE Computer Society, San Jose, CA, Feb. 26-Mar. 1, 2002, 10 pages.

Quddus et al. "Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328, 17 pages.

Ringberg et al., "Sensitivity of PCA for Traffic Anomaly Detection", SIGMETRICS 2007, Jun. 12-16, 2007, pp. 109-120, 12 pages.

Saltenis, "Outlier Detection Based on the Distribution of Distances between Data Points", retrieved on Dec. 12, 2008 at <<http://www.mii.lt/informatica/pdf/INFO558.pdf>>, INFORMATICA, vol. 15, No. 3, 2004, pp. 399-410, 12 pages.

Salton, Gerard, "Dynamic Document Processing", Communications of the ACM, vol. 15, Issue 7, Jul. 1972, pp. 658-668, 11 pages.

Salton et al., "A Vector Space Model for Automatic Indexing", Communications of the ACM, vol. 187, No. 11, Nov. 1975, pp. 613-620, 8 pages.

Sarwar et al, "Application of Dimensionality Reduction in Recommender System—A Case Study", ACM WebKDD Workshop, Aug. 2000, 12 pages.

Liao et al., "Extracting Places and Activities from GPS Traces Using Hierarchical Conditional Random Fields", The International Journal of Robotics Research, vol. 26, Issue 1, Jan. 9, 2007, pp. 119-134, 17 pages.

Terminal Disclaimer Decision mailed Jul. 18, 2013 from U.S. Appl. No. 12/711,130, 1 page.

Response filed Oct. 2, 2013 to the Sep. 6, 2013 Notice to File Corrected Application Papers from U.S. Appl. No. 12/711,130, 3 pages.

Notice to File Corrected Application Papers mailed Mar. 9, 2010 from U.S. Appl. No. 12/712,053, 2 pages.

Response filed May 10, 2010 to Notice to File Corrected Application Papers mailed Mar. 9, 2010 from U.S. Appl. No. 12/712,053, 6 pages.

Non-Final Office Action mailed May 20, 2016 from U.S. Appl. No. 12/712,857, 35 pages.

Response filed Sep. 20, 2016 to the Non-Final Office Action mailed May 20, 2016 from U.S. Appl. No. 12/712,857, 13 pages.

Response filed May 17, 2016 to the Non-Final Office Action mailed Mar. 2, 2016 from U.S. Appl. No. 12/794,538, 33 pages.

Final Office Action mailed Aug. 2, 2016 from U.S. Appl. No. 12/794,538, 24 pages.

Response filed Sep. 20, 2016 to the Final Office Action mailed Aug. 2, 2016 from U.S. Appl. No. 12/794,538, 42 pages.

Response filed May 4, 2016 to the Non-Final Office Action mailed Feb. 26, 2016 from U.S. Appl. No. 13/324,758, 30 pages.

Final Office Action mailed Jul. 13, 2016 from U.S. Appl. No. 13/324,758, 13 pages.

Response and After Final Consideration Program Request filed Sep. 13, 2016 to the Final Office Action mailed Jul. 13, 2016 from U.S. Appl. No. 13/324,758, 17 pages.

Advisory Action, Applicant-Initiated Interview Summary and After Final Consideration Program Decsion mailed Sep. 27, 2016 from U.S. Appl. No. 13/324,758, 14 pages.

Shekhar et al., "Data Mining for Selective Visualization of Large Spatial Datasets", Proceedings of the 14th IEEE International Conference on Tools with Artificial Intelligence, 2002, pp. 41-48, 8 pages.

Sohn et al., "Mobility Detection Using Everyday GSM Traces", retrieved on Aug. 4, 2009 at http://www.placelab.org/publications/pubs/mobility-ubicomp2006.pdf, UBICOMP 2006, pp. 212-224, 14 pages.

Spertus et al, "Evaluating Similarity Measures: A Large Scale Study in the Orkut Social Network", Proceedings of the 11th ACM SIGKDD International Conference on Knowledge Discovery in Data Mining, Aug. 21-24, 2005, 7 pages.

Sun, Pei and Sanjay Chawla, "On Local Spatial Outliers", Technical Report No. 549, Jun. 2004, retrieved at http://sydney.edu.au/engineering/it/ research/tr/tr549.pdf, 9 pages.

Taylor, George and Geoffrey Blewitt, "Virtual Differential GPS & Road Reduction Filtering by Map Matching", Proceedings of

(56) References Cited

OTHER PUBLICATIONS

ION'99 Twelfth International Technical Meetings of the Satellite Division of the Institute of Navigation, Sep. 14-17, 1999, pp. 1675-1684, 10 pages.
Tsoukatos, Ilias and Dimitrios Gunopulos, "Efficient Mining of Spatiotemporal Patterns", Proceedings of the 7th International Symposium on Spatial and Temporal Databases LNCS 2121, Redondo Beach, CA, Jul. 12-15, 2001, pp. 125-442, 18 pages.
Neng et al., "Design and Implementation of Spatial Temporal Data Model in Vehicle Monitor System", retrieved at http://www.geocomputation.org/2005/Weng.pdf, Proceedings of the 8th International Conference on GeoComputation, Jul. 31-Aug. 3, 2005, 8 pages.
Wikipedia, "Operating System", retrieved from http://en.wikipedia.org/wiki/Operating—system on Oct. 8, 2010, 1 page.
Winograd, Terry, "Dynamic Cartograms for Navigating Geo-referenced Photographs", available at least as early as Nov. 16, 2007, retrieved at http://cs.stanford.edu/research/project.php?id=289, on Nov. 19, 2007, 2 pages.
Wu et al., "Spatio-Temporal Outlier Detection in Precipitation Data", Knowledge Discovery from Sensor Data, retrieved at http://sydney.edu.au/engineering/it/ewu1/publications/WuLiuChawlaSensorKDD2008.pdf, 2010, pp. 115-133, 20 pages.
Xie, Xing, "Understanding User Behavior Geospatially", Microsoft Research, Nov. 2008, retrieved at http://drops.dagstuhl.de/volltexte/2009/2017/pdf/08251.XieXing.ExtAbstract.2017.pdf, 2 pages.
Xue, Feng, "Efficient Similarity Search in Sequence Database", retrieved on Apr. 15, 2010 at http://www.cs. uwaterloo.ca/david/cs848/presentation-similarity-fengxue.pdf, University of Waterloo, Ontario Canada, Course Paper: CS 860 Topics in Database Systems, Nov. 18, 2009, 7 pages.
Yan, et aL, "Feature-based Similarity Search in Graph Structures", ACM Translations on Database Systems, vol. V, No. N, Jun. 2006, 36 pages.
Yegulalp, Serdar, "Change the Windows 2000 DNS cache", published Aug. 21, 2002, retrieved on Apr. 29, 2008 at http://searchwincomputing.techtarget.com/tip/0,289483,sid68—gci1039955,00.html, SearchWinComputing.com, 3 pages.
Yuxiang et al., "Detecting Spatio-temporal Outliers in Climate Dataset: A Method Study", IEEE 2005, pp. 760-763, 4 pages.
Zhang et al., "A Taxonomy Framework for Unsupervised Outlier Detection Techniques for Multi-Type Data Sets" Technical Report TR-CTIT-07-79, Centre for Telematics and Information Technology University of Twente, Enschede, 2007, 40 pages.
Zhnag et al., "Mining Non-Redundant High Order Correlations in Binary Data", International Conference on Very Large Data Bases (VLDB), Aukland, NZ, Aug. 23-28, 2008, pp. 1178-1188, 11 pages.
Zhang et al., "iBAT: Detecting Anomalous Taxi Trajectories from GPS Traces", Proceedings of UbiComp, Sep. 1-7-21, 2011, 10 pages.
Zhang et al., "Network Anomography", USENIX Association, Internet Measurement Conference 2005, pp. 317-330, 14 pages.
Zhao, Zheng and Huan Liu, "Searching for Interacting Features", Proceedings of the 20th International Joint - Conference on Artificial Intelligence, Hyderabad, India, Jan. 6-12, 2007, pp. 1156-1161, 6 pages.
"North York Moors and Yorkshire Wolds Mountain Bike (MTB) Routes", retrieved on Jan. 17, 2008 from http:// www.mtb-routs.co.uk/northyorkmorrs/defaultaspx, 2006, 4 pages.
Kuhne et al., "New Approaches for Traffic Management in Metropolitan Areas," In 10th IFAC Symposium on Control in Transportation Systems, Aug. 4-6, 2003, 9 pages.
Xu et al., "RT-Tree: an Improved R-Tree Indexing Structure for Spatiotemporal Spatial Databases," Proceedings of the International Symposium on Spatial Data Handling, SDH, Jul. 1990, pp. 1040-1049, 5 pages.
"Lifelog (DARPA)", retrieved at http://www.darpa.mil/ipto/programs/lifelog/index.htm, publication date: unknown, 1 page.
Response filed Dec. 30, 2015 to Final Office Action mailed Oct. 7, 2015 from U.S. Appl. No. 12/712,857, 17 pages.
Notice of Allowance mailed Jan. 22, 2016 from U.S. Appl. No. 12/712,857, 7 pages.
Non-Final Office Action mailed Mar. 2, 2016 from U.S. Appl. No. 12/794,538, 13 pages.
Non-Final Office Action mailed Feb. 26, 2016 from U.S. Appl. No. 13/324,758, 40 pages.
Yi, Jagadish, haloutsos, "Efficient htetneval of Similar lime Sequences under lime Warping", retrieved on Apr. 15, 2010 at <<http://www.google.com/url?sa=t&source=web&ct=res&cd=3&ved=0CBYQFJAC&url=http%3A%2F%2Fciteseerx.ist.psu.edu%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5SA4—0—Aalk5z8DA&usg=AFQjCNEkCq5vQwgb60QfZmT—RWcgMZ2YNA>>, IEEE Computer, pp. 1-15 of presentation slide (1997, 15 pages).
Wikipedia, "Nokia Lifeblog", retrieved at https://en.wikipedia.org/wiki/Nokia_Lifeblog, on Feb. 26, 2008, 2 pages.
Hanlon, Mike, "Nokia Lifeblog is an automated multimedia diary," retrieved at http://www.gizmag.com/go/2729/, Jun. 4, 2004, 5 pages.
Blandford, Rafe, "Looking at Lifeblog," retrieved at http://www.allaboutsymbian.comffeatures/item/Looking_at_Lifeblog.php, Oct. 18, 2004, 14 pages.
Mead, Nick, "Lifeblog 2.5," retrieved at http://lifeblog.en.softonic.com/symbian, Feb. 25, 2008, 2 pages.
Wikipedia, "DARPA LifeLog," retrieved at https://en.wikipedia.org/wiki/DARPA_LifeLog, Dec. 14, 2013, 1 page.
Shachtman, Noah, "Pentagon Kills Lifelog Project," retrieved at http://www.wired.com/2004/02/pentagon-kills-lifelog-project/, Wired, Feb. 4, 2004, 6 pages.
Shachtman, Noah, "A Spy Machine of Darpa's Dreams," retrieved at http://archive.wired.com/techbiz/media/news/2003/05/58909?currentPage=all, Wired, May 20, 2003, 1 page.
Geek Magazine, "LifeLog: DARPA looking to record lives of interested parties," retrieved at http://www.geek.com/news/lifelog-darpa-looking-to-record-lives-of-interested-parties-5528791, retrieved on Sep. 23, 2013, 3ublished on Jun. 3, 2003, 4 pages.
Weeks, Darren, "LifeLog: Because Big Brother Cares What You're Thinking," retrieved at http://www.sweetliberty.org/issues/privacy/lifelog.htm on Dec. 3, 2005, Big Brother, 5 pages.
Applicant-Initiated Interview Summary mailed Sep. 30, 2016 from U.S. Appl. No. 12/794,538, 3 pages.
Notice of Allowance mailed Oct. 24, 2016 from U.S. Appl. No. 12/794,538, 8 pages.
Response filed Oct. 13, 2016 to the Final Office Action mailed Jul. 13, 2016 from U.S. Appl. No. 13/324,758, 17 pages.
Non-Final Office Action mailed Nov. 28, 2016 from U.S. Appl. No. 13/324,758, 11 pages.

* cited by examiner

LEARNING TRANSPORTATION MODES FROM RAW GPS DATA

RELATED APPLICATIONS

This application is a continuation of U.S. application Ser. No. 12/037,305, filed on Feb. 26, 2008, entitled "LEARNING TRANSPORTATION MODES FROM RAW GPS DATA" and/or U.S. application Ser. No. 13/195,496, filed on Aug. 1, 2011, entitled "LEARNING TRANSPORTATION MODES FROM RAW GPS DATA", at least some of which may be incorporated herein.

BACKGROUND

Many users of global positioning system (GPS) devices upload their GPS data (tracks) to the Internet, sometimes in conjunction with photographs and the like, such as for sharing travel and other experiences. In addition to sharing with others, users that upload their GPS tracks may benefit by having a better record of past events, which helps in reliving past events and gaining an understanding of their life patterns. At the same time, applications can attempt to learn from such GPS data, such as to determine popular routes to recommend to others, plan traffic, and so forth.

In general, raw GPS data are browsed and otherwise analyzed directly, without much understanding or context. For example, it would be more useful to applications if users would manually tag or otherwise annotate their GPS tracks with additional information, such as whether they were walking or riding at a particular time. However, there is generally no motivation for users to do so to benefit some unknown application, and further, it is difficult for people to remember the accurate time during a given trip when such additional information is appropriate to include.

Additional data collected by other sensors such as cellular phone devices and towers, Wi-Fi, RFID, and/or other information extracted from geographic maps, such as road networks, may help in interpreting GPS data, but this has its own drawbacks. Some of the drawbacks include a need to have a sufficient number of sensors available and positioned at meaningful locations, the need to correlate such other data with GPS data, the need for users to have cellular phones and/or Wi-Fi devices active and/or possess RFID tags, and so forth. As a result, only raw GPS data is consistently available.

However, given raw GPS data, simple mechanisms cannot accurately infer additional information such as a user's transportation mode. For example, velocity-based rules for determining whether a user is walking or riding fail when traffic conditions and/or weather cause driving velocity to be as slow as walking. When user takes more than one kind of transportation mode along a trip, the problem becomes more difficult.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which positioning (e.g., raw GPS) data is processed into segments of a trip, with a predicted mode of transportation determined for each segment. In one example implementation, segments are first characterized as walk segments or non-walk segments based on velocity and/or acceleration data gleaned from the GPS data. Features corresponding to each of those walk segments or non-walk segments are extracted, and analyzed with an inference model to determine a most probable mode of transportation for each segment. Before selection of a transportation mode based on the probabilities provided by the inference model, post-processing may consider the possible modes as candidates, and modify their respective probabilities, such as to factor in the probability of transitioning to each candidate from a transportation mode of an adjacent segment.

In one aspect, such as to produce more accurate results, when first characterizing points as corresponding to walk segments or non-walk segments, segments below a threshold merging length are merged into another segment. Further, segments below a threshold uncertainty length may be considered uncertain; an uncertain segment may be merged with one or more other consecutive uncertain segments into a non-walk segment.

The results comprise a predicted mode of transportation inferred for each segment of a trip. The results may be output in some manner, such as to tag the GPS data with information corresponding to the predicted mode of transportation for each segment.

Other advantages may become apparent from the following detailed description when taken in conjunction with the drawings.

BRIEF DESCRIPTION OF THE DRAWINGS

The disclosed subject matter is illustrated by way of example and not limited in the accompanying figures in which like reference numerals indicate similar elements and in which.

DETAILED DESCRIPTION

Various aspects of the technology described herein are generally directed towards automatically determining transportation modes from raw GPS data, including multiple transportation modes in a single trip, and detecting transitions between modes. In one example implementation, this is accomplished via a change point-based segmentation method, an inference model, and a post-processing algorithm that is based on conditional probability. In an alternative implementation, conditional random field inference provides the inference model without the need for post-processing.

In one aspect, GPS tracks submitted by users may be automatically tagged with inferred transportation modes, whereby, for example, a user has a better record of the user's own past, while others have more information of the user's experiences when browsing a GPS track. Further, data from active GPS devices (such as built into a cellular telephone with GPS capability) may be dynamically processed to infer a current transportation mode, so that, for example, people can retrieve directions and other information applicable to their current mode of transportation. Examples of dynamic inference include providing map information with different map scales for walking versus riding, providing a relevant bus schedule, and so forth.

While the examples herein are generally directed towards certain transportation modes (e.g., walking, driving, bicycling, commuting by bus), it is understood that these are only examples. As can be readily appreciated, the technology described herein is applicable to many other forms of transit, such as jogging, nautical transit, aeronautical transit, and so forth, alone or in any combination. Further, while various mechanisms such as classifiers are described as being suitable for use in determining a most-likely transportation mode corresponding to particular features within GPS data, other mechanisms may be employed.

As such, the disclosed subject matter is not limited to any particular embodiments, aspects, concepts, structures, functionalities or examples described herein. Rather, any of the embodiments, aspects, concepts, structures, functionalities or examples described herein are non-limiting, and the disclosed subject matter may be used various ways that provide benefits and advantages in computing and/or data processing in general.

Figure 1:
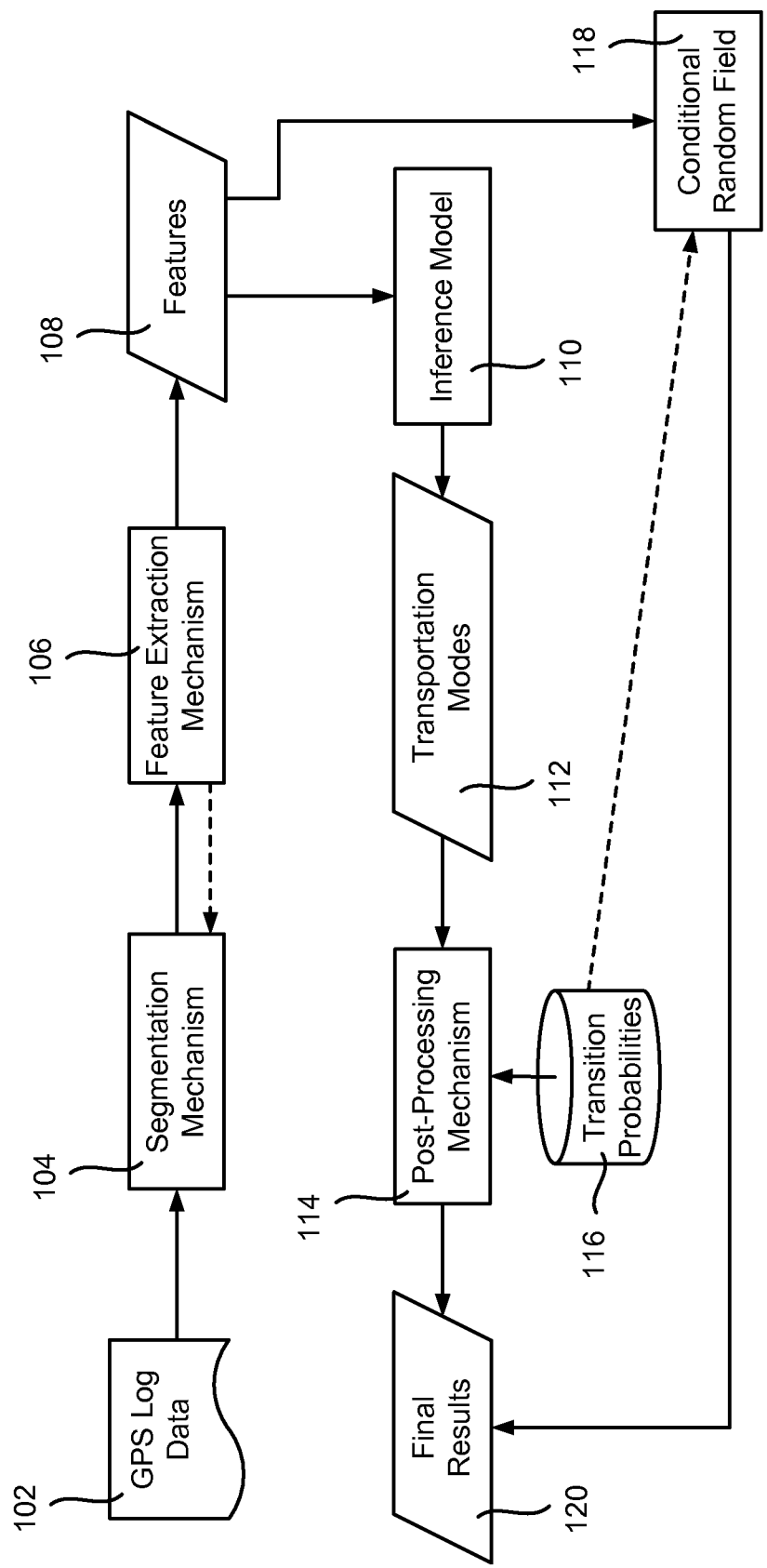
FIG. 1 is a block diagram representing example components for processing GPS data to determine transportation modes.

Turning to FIG. 1, there is shown a general set of components for processing GPS data to determine transportation modes, such as for tagging that data. As shown in FIG. 1 and as described below, when GPS log data 102 (e.g., in a file) is processed to determine transportation modes, a segmentation mechanism 104 divides the GPS data into trips, and then partitions each trip into segments. In general, the segmentation mechanism 104 differentiates trips based on time intervals, and further, distinguishes segments within each trip via change points (CP) detected in the data 102.

Figure 2:
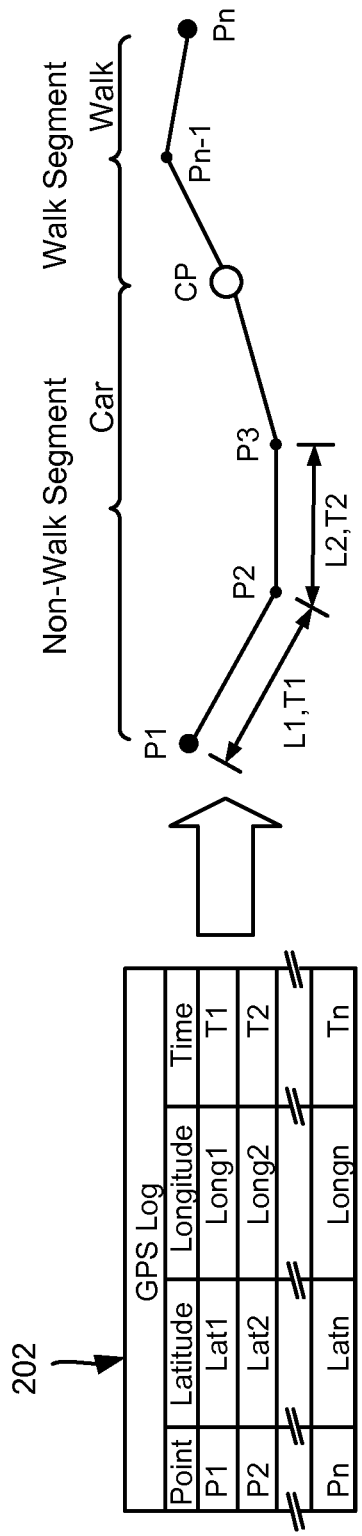
FIG. 2 is a representation of an example set of segments generated from GPS data.

More particularly, as depicted in FIG. 2, an example GPS log 202 comprises a sequence of GPS points P1-Pn (or alternatively, Pi∈{P1, P2, . . . , Pn}). Each GPS point Pi comprises a latitude, a longitude and a timestamp. As can be readily appreciated, velocity information and acceleration information may be computed from such data.

Given a GPS log (e.g., 202) to process, the segmentation mechanism 104 sequentially connects the GPS points into a track, and divides the track into trips based on the time interval between the consecutive points, e.g., separate trips are established when the time interval exceeds a certain threshold (e.g., twenty minutes). As will be understood, a change point (CP) represents a place where the user changed a transportation mode, e.g., from riding in a car to walking.

The duration of a trip is the time interval between its start point and end point, while the length of a trip comprises the sum of the distances between consecutive points along the trip (e.g., P1 to P2 plus P2 to P3 . . . plus Pn−1 to Pn). The same general definitions apply to each segment, that is, the duration of a segment is the time interval between its start point and end point, while the length of a segment comprises the sum of the distances between the consecutive points on the segment, e.g., CP to Pn−1, plus Pn−1 to Pn.

Because users often change their mode of transportation during a trip, a trip may contain two or more transportation modes. As described below, the segmentation mechanism 104 separates the segments for different transportation modes first by differentiating walk segments from non-walk segments; note that as used herein, segments likely corresponding to walking are referred to as walk segments, while the segments of other transportation modes (e.g., car, bicycle, bus) are referred to as non-walk segments. Similarly, each of the GPS points of a walk segment, such as Pn−1 in FIG. 2, is referred to as a walk point, while each of the GPS points of non-walk segments, e.g., P2 in FIG. 2, is called a non-Walk Point. In the example of FIG. 2, a trip from P1 to Pn is partitioned into a walk segment and a non-walk segment, with the transition represented by a change point CP.

Change points are detected automatically using rules based on certain observations, namely that people stop, and then go, when changing their transportation modes, that is, there are some GPS data indicative of a velocity close to zero during such a transition. Further, to a high probability, "walk" indicates a transition between different transportation modes, that is, the start point and end point of a walk segment each corresponds to a change point, to a relatively very high probability.

As shown in the following table, the above observations may be measured and have been proven correct in the transition matrix (with transportation mode labels provided for corresponding GPS data by actual volunteer users):

| Transportation modes | Walk | Car | Bus | Bike |
| --- | --- | --- | --- | --- |
| Walk | / | 53.4% | 32.8% | 13.8% |
| Car | 95.4% | / | 2.8% | 1.8% |
| Bus | 95.2% | 3.2% | / | 1.6% |
| Bike | 98.3% | 1.7% | 0% | / |

As can be seen, Car, Bus and Bike modes may (e.g., almost always) transition to the Walk mode, with a direct transition between them without walking being quite rare, possibly due to mislabeling. For example, a person may have recorded taking a taxi immediately after getting off a bus, while forgetting to include a very short Walk segment between these two transportation modes when labeling the GPS data. Such events are likely responsible for the small percentages corresponding to a direct transition between Car and Bus; notwithstanding, a Walk segment essentially exists in this situation.

Once segmented, a feature extraction mechanism 106 extracts various features from each segment and sends these features to an inference model 110 to learn a user's transportation mode or modes 112. In one implementation, example features for a segment include length, mean velocity, expectation of velocity, covariance of velocity, top three velocities and top three accelerations from each segment. Note that because the features of a segment may be influenced by an abnormal point/positional error, top three velocities and top three accelerations are selected instead of the maximum velocity and maximum acceleration. Further note that the segmentation mechanism 104 uses length data, velocity data and acceleration data, and may work in conjunction with the feature extraction mechanism 106 as indicated in FIG. 1 via the dashed arrow between these example components.

Various techniques may be considered to determine the predicted transportation modes, such as when selecting the inference model 110. For example, each of the segments of GPS tracking data may be regarded as an independent instance, which is then classified using general classifiers, such as a decision tree-type classifier. Other suitable types of models that may be implemented as the inference model 110 include Bayesian Net and Support Vector Machine (SVM) models. After the inference model 110 predicts the transportation modes 112, a post-processing mechanism 114 that considers transition probabilities 116 between different transportation modes may be used to improve the prediction accuracy and provide final results 120.

Figure 3:
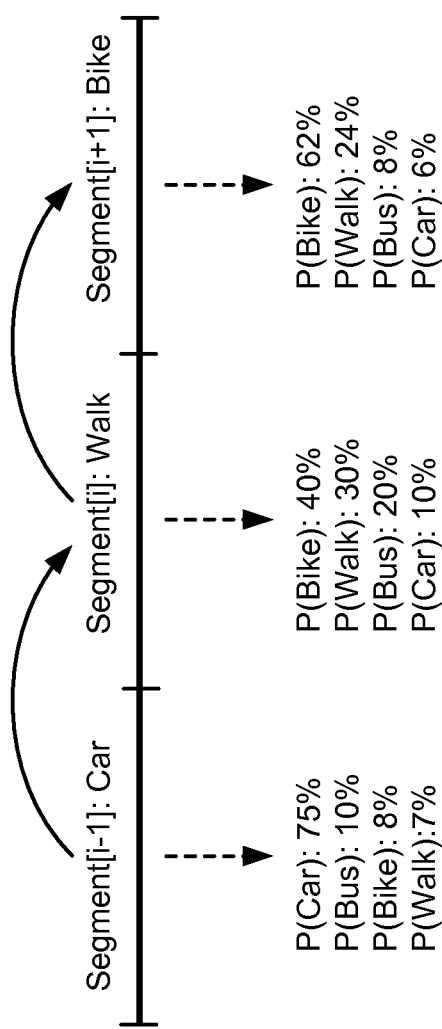
FIG. 3 is a representation of probability data for segments determined from features extracted from GPS data, in which post-processing corrects prediction errors.

In one example, after the inference process, the predicted transportation modes are ranked by their probability values, as depicted in FIG. 3. However, directly selecting the most likely transportation mode as the final results may be incorrect. In the example of FIG. 3, before post-processing, the prediction-based ranking is Car, followed by Bike followed by Bike. In actuality, this ranking is erroneous, as the correct prediction is Car, followed by Walk followed by Bike.

By post-processing, which considers the conditional probability between different transportation modes, the prediction accuracy may be improved; for example, it is more likely that a user exiting a car will walk to a bicycle than directly switch to a bicycle. If in a segment such as the segment i−1 in FIG. 3, the probability of the top transportation mode exceeds a threshold (e.g., seventy percent in one example implementation), this transportation mode is used as the final prediction result on this segment. Post-processing recalculates the probability of each candidate transportation mode based on its adjacent segment, e.g., segment i, according to the following equations:

$$\text{Segment}[i].P(\text{Bike}) = \text{Segment}[i].P(\text{Bike}) \times P(\text{Bike}|\text{Car}), \quad (1)$$

$$\text{Segment}[i].P(\text{Walk}) = \text{Segment}[i].P(\text{Walk}) \times P(\text{Walk}|\text{Car}), \quad (2)$$

. . .

where P(Bike|Car) and P(Walk|Car) stands for the transition probability from Car to Bike and from Car to Walk, respectively. Segment[i].P(Bike) represents the probability of Bike on the segment i. After the calculations, the candidate transportation mode with the maximum probability is used as the final results. In the example of FIG. 3, because the transition probability between Car and Bike is very small, the probability of Bike is less than that of Walk after the post-processing computations corresponding to equations (1) and (2).

An alternative inference technique regards the GPS 102 data as a kind of sequential data when using the features 108. To this end, conditional random field (CRF) 118, a framework for building probabilistic models to segment and label sequence data, may be leveraged to perform the inference into the final results 120. Note that because the conditional probabilities between different transportation modes are considered in the conditional random field framework's graphical model, post-processing is not needed.

Figure 4:
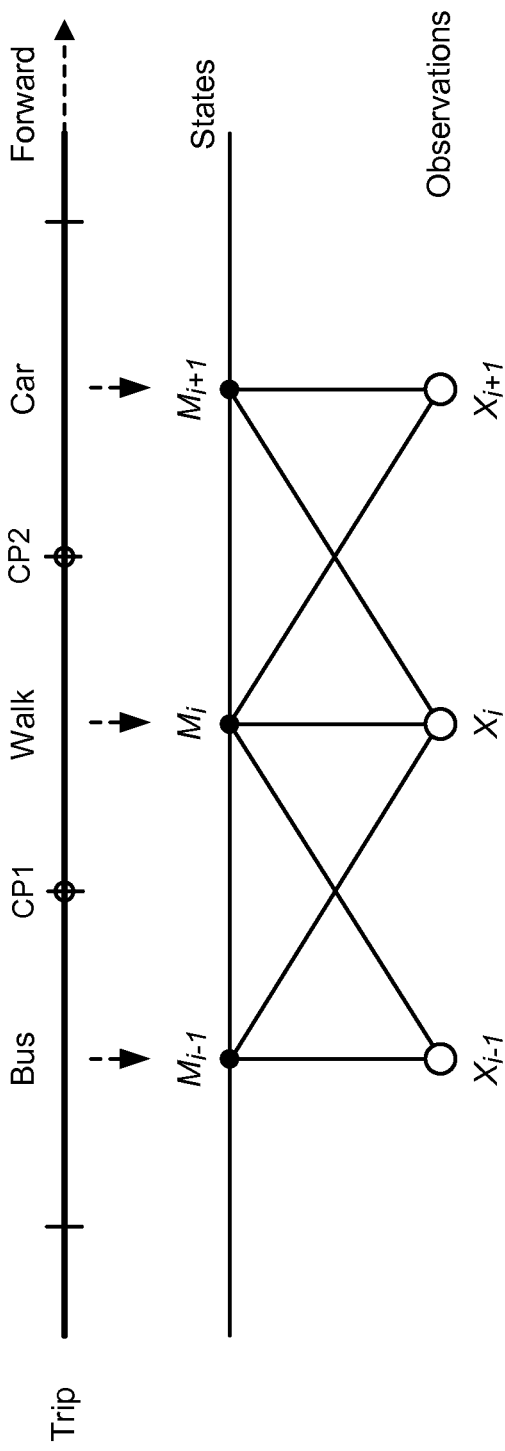
FIG. 4 is a representation of a graphical model corresponding to inferring transportation modes via a conditional random field inference framework.

By way of example, FIG. 4 depicts a trip where a person changes transportation modes from Bus to Walk, and then to Car. After being partitioned via the two change points CP1 and CP2, the trip is divided into three segments. The upper line of the graphical model is a sequence of states { . . . , $M_{i-1}$, $M_{i+1}$, . . . } represented by black nodes, while each white node { . . . , $X_{i-1}$, $X_i$, $X_{i+1}$, . . . } on the lower line denotes the observation of corresponding state. Each observation and corresponding state compose an instance <$X_i$, $M_i$>, and these consecutive instances construct a sequence. In one example approach, each state represents the transportation mode of a segment while an observation comprises the features extracted from the segment. The lines connecting a state $M_i$ to its adjacent observations $X_{i-1}$ and $X_{i+1}$ signify that each state not only depends on the current observation, but also depends on its previous and next observation. In other words, a person's present transportation mode has a close relationship with the modes of both the previous and the next segment.

Figure 5:
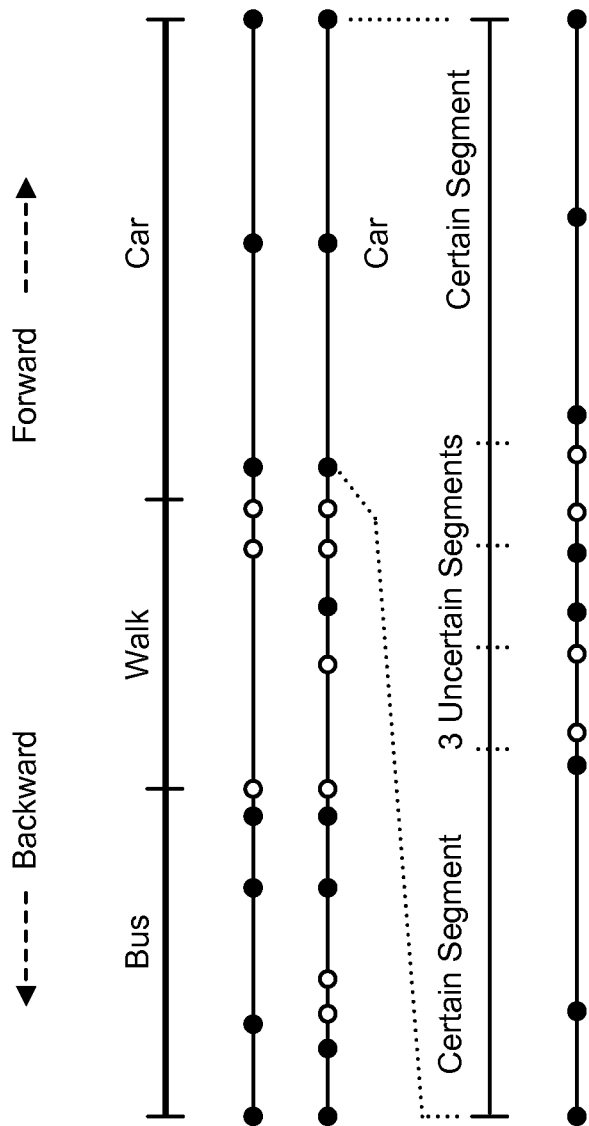
FIG. 5 is a representation of a set of segments and data points exemplifying the detection of change points.
Figure 6A:
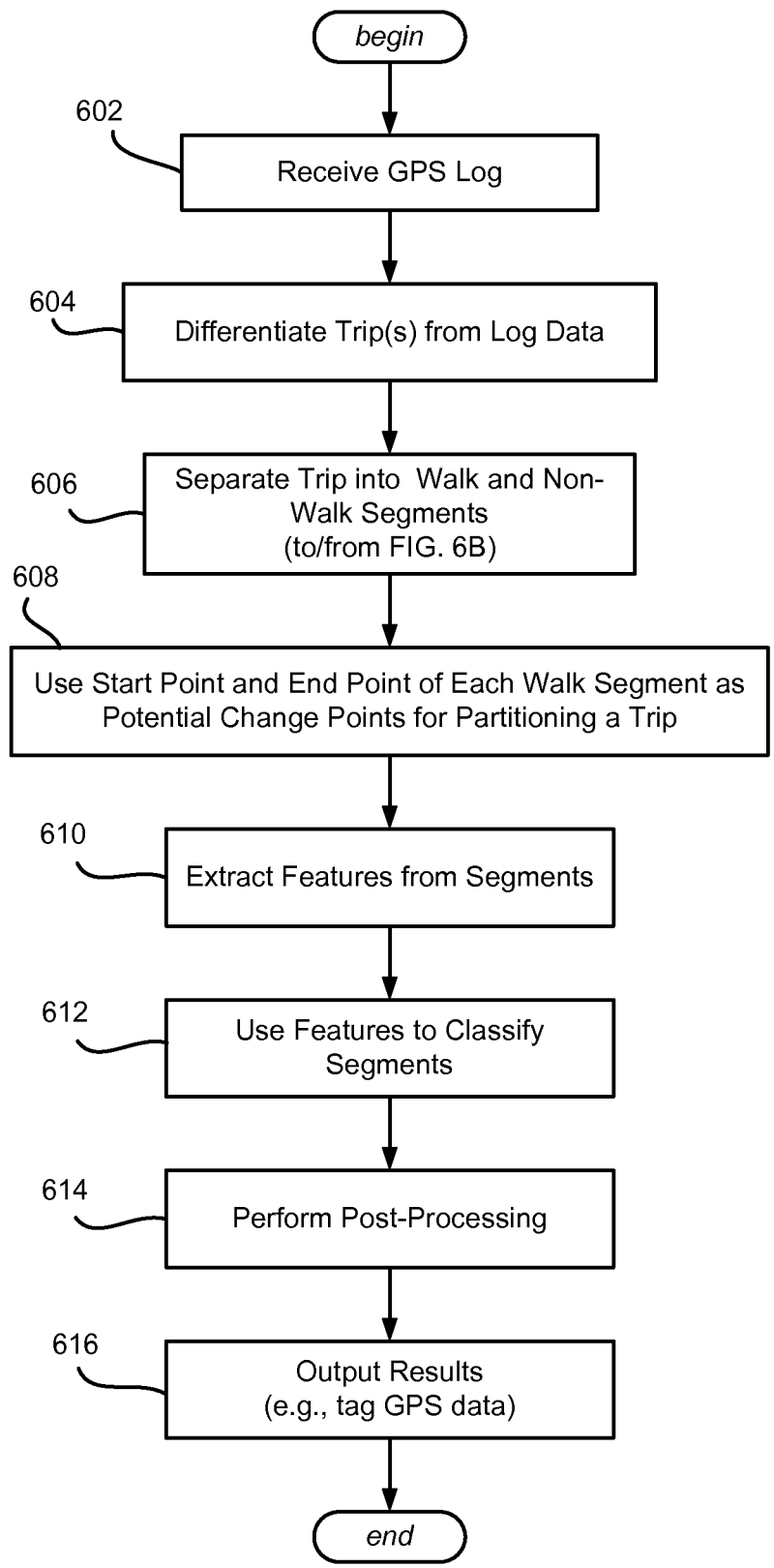
FIGS. 6A and 6B comprise a flow diagram showing example steps taken to process GPS data to determine transportation modes.
Figure 6B:
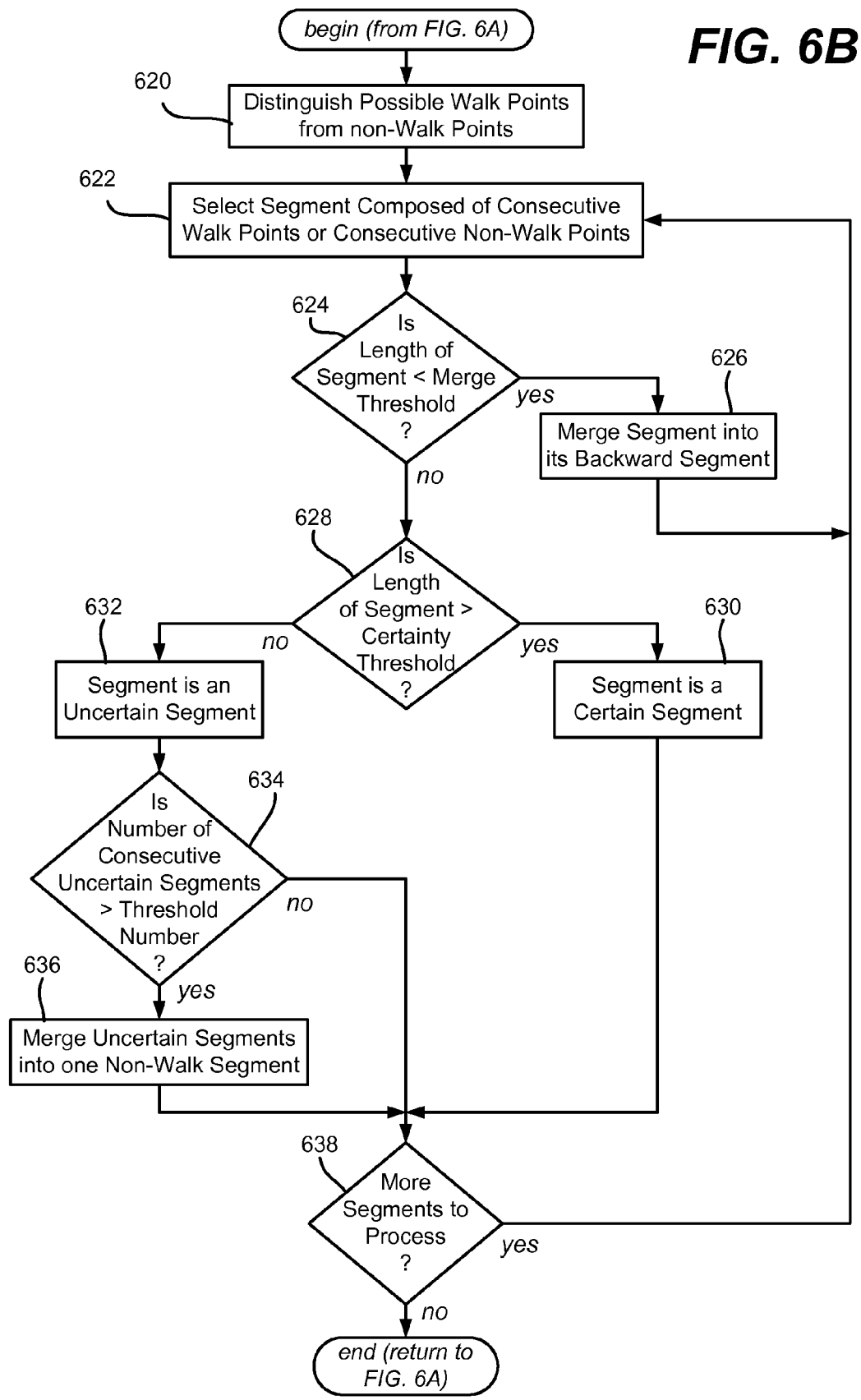

FIG. 5 is an example representing a person changing transportation modes from Bus to Car, using Walk as a transition mode. FIGS. 6A and 6B comprise a flow diagram representing example steps that may be used to predict these modes. In general, the steps of FIGS. 6A and 6B first detect probable walk segments within a trip by determining change points, which are then used to partition the trip into alternating walk segments and non-walk segments. Later, via each segment's features, the segments can be classified as walk, bus, car and/or bicycle; note that in one example implementation, the mode of transportation is predicted as one of four modes, namely Bike, Bus, Car and Walk, although as can be readily appreciated in alternative implementations the features may be processed to predict other modes. Further, in this example implementation, "Car" is one mode, regardless of whether the person is riding in a private vehicle or taking a taxicab.

Given real world observations as well as the knowledge mined from GPS data, the change points are first determined by differentiating walk and non-walk segments of a trip. This initial categorization into two classes (walk or non-walk) rather than directly into four classes {Bike, Bus, Car, Walk}, reduces the complexity of segmentation. Subsequently, the features of each segment may be extracted to infer the most probable transportation mode.

Step 602 of FIG. 6A represents receiving a GPS log, which at step 604 has its data partitioned into trips based on timing, e.g., generally fixed durations over twenty minutes delineate separate trips. Then, for a given trip (processing may be performed for each trip), step 606 separates the trip into walk and non-walk segments. FIG. 6B provides additional details on the separation.

More particularly, step 620 of FIG. 6B represents distinguishing the possible walk points from more definite non-walk points. For example, using a loose upper bound of velocity (Vt) and of acceleration (at), such as v=1.8 m/s and a=0.6 m/s$^2$, acceptable results with reasonably good precision are provided; a person exceeding either of those bounds is not walking at the corresponding point.

As shown in FIG. 5, each possible walk point (the white points in FIG. 5, in contrast to the black points which represent non-walk points) corresponds to a GPS point whose velocity (P.V) and acceleration (P.a) are both smaller than the given bound. As shown in the uppermost set of points in FIG. 5, in an ideal case, only one Walk segment will be detected from this trip.

However, as depicted by the middle set of points in FIG. 5, when a car or bus moves slowly, GPS points from actual non-Walk segments may be detected as possible walk points. Also, because of errors, points from a Walk segment may exceed the bound and become non-walk points. To reduce the probability of such errors, step 624 evaluates the length of each retrieved segment against a certain distance, i.e., a merge threshold. If shorter than the threshold, the segment is merged into its backward (previous) segment. In other words, if the length of a segment composed by consecutive walk points or non-walk points less than a merging threshold distance, the segment is merged into its backward segment (if any) at step 626.

By way of example, the two walk points in the segment of Bus within the middle set of points do not form a segment because of the relatively short distance between them. The same (or similar) criterion is also applied to handle any outlier points (the black points) in the Walk segment.

After any backwards merging, the trip is divided into a series of one or more alternate Walk segments and non-Walk segments. However, as represented by the lower set of points in FIG. 5, the walk points are only possible walk points, because for example a non-walking user may have encountered traffic congestion. It is not correct for the inference model to directly predict transportation modes over the features extracted from such uncertain segments.

In general, the longer a segment is, the richer the features of its transportation mode. As a result, a longer segment leads to a more correct prediction of that segment's corresponding transportation mode. In contrast, the shorter a segment is, the higher the uncertainty.

To avoid incorrect partitioning based on short segments, step 628 evaluates the length of the segment against a certainty threshold distance (e.g., fifty meters). If the segment length exceeds the threshold, the segment is considered a "certain" segment (step 630). Otherwise the segment is considered an "uncertain" segment (step 632), that is, the process is uncertain as to the transportation mode of this segment even if currently considered a Walk segment. If at step 634 the number of consecutive uncertain segments exceeds a threshold number, e.g., three in one example implementation, such a set of uncertain segments is considered to be a non-Walk segment. In general, users ordinarily do not often change their transportation modes within such a short distance; for example, as depicted by the lower set of points in FIG. 5, within a certain distance it is not realistic for a person to transition from Car to Walk to Car to Walk to Car. As the result, the middle three segments between the two certain segments are very likely also non-Walk Segments, that is, Car in this particular example. Thus, the process merges the three uncertain segments into one non-walk segment before performing the subsequent inference. Step 638 represents repeating the processing for other segments of the trip.

At this time, the start point and end point of each Walk segment are defined as potential change points, which are then used to partition a trip, as generally represented via step 608 of FIG. 6A.

Step 610 represents extracting other features from the segments, which step 612 uses to classify the segments. For example, non-Walk segments may be classified as Car, Bus or Bicycle based on their corresponding features.

Step 614 represents performing post-processing (if appropriate for the inference model) as described above. Step 616 represents outputting the results, e.g., tagging the GPS data with the predicted transportation modes.

As can be readily appreciated, the above-described processing can infer compound trips containing more than one kind of transportation mode. In addition, the processing can correctly detect the transitions between different transportation modes. This may be accomplished only via raw GPS data, independent of other information from maps and other sensors. Further, the model learned from the dataset of some users can be applied to infer transportation modes from the GPS data of others.

Exemplary Operating Environment

Figure 7:
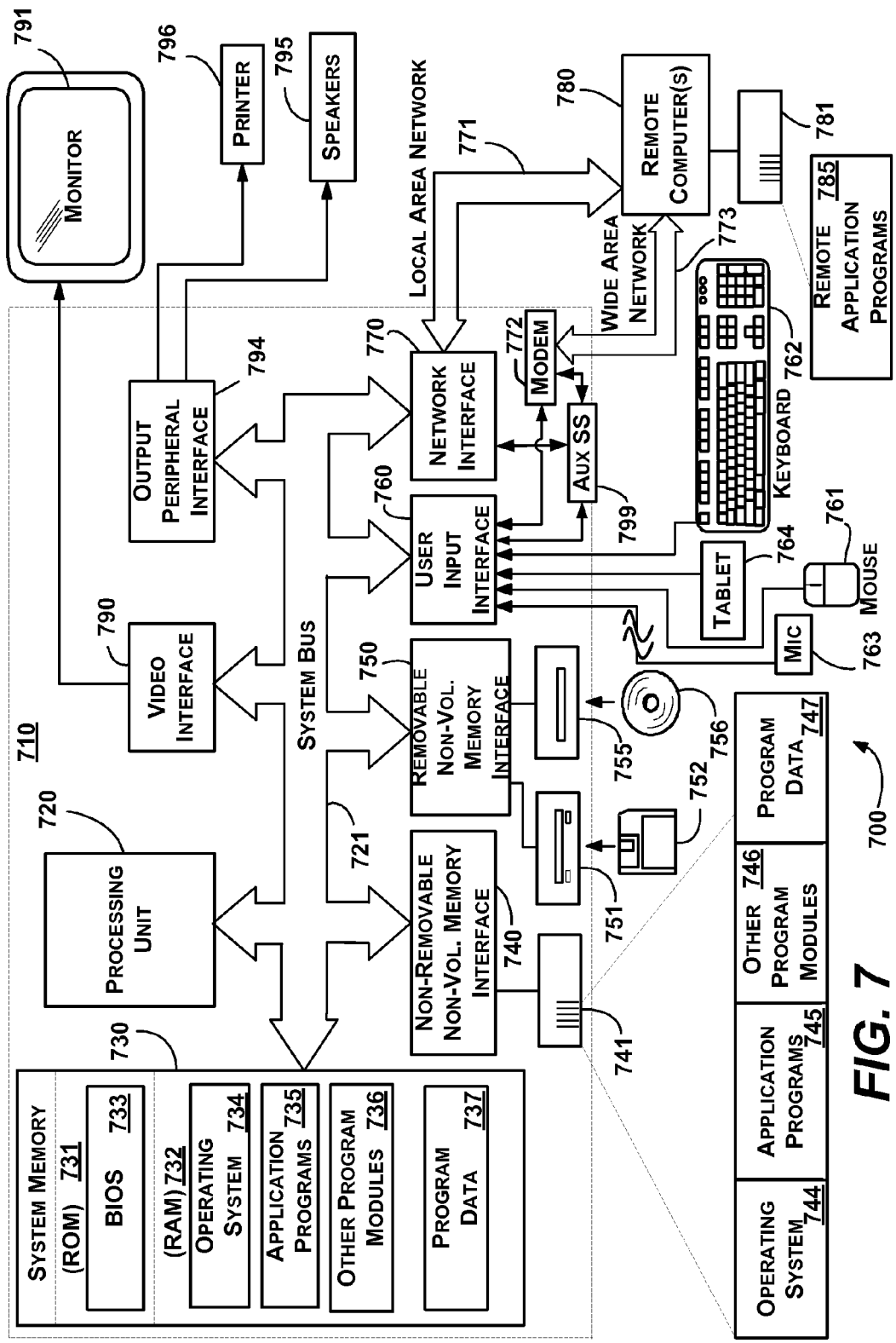
FIG. 7 shows an illustrative example of a computing environment into which various aspects of the disclosed subject matter may be incorporated.

FIG. 7 illustrates an example of a suitable computing and networking environment 700 on which the examples of FIGS. 1-6 may be implemented. For example, the various mechanisms of FIG. 1 may be implemented in the computer system 710. The computing system environment 700 is only one example of a suitable computing environment and is not intended to suggest any limitation as to the scope of use or functionality of the disclosed subject matter. Neither should the computing environment 700 be interpreted as having any dependency or requirement relating to any one or combination of components illustrated in the exemplary operating environment 700.

The disclosed subject matter is operational with numerous other general purpose or special purpose computing system environments or configurations. Examples of well known computing systems, environments, and/or configurations that may be suitable for use with the disclosed subject matter include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosed subject matter may be described in the general context of computer-executable instructions, such as program modules, being executed by a computer. Generally, program modules include routines, programs, objects, components, data structures, and so forth, which perform particular tasks or implement particular abstract data types. The disclosed subject matter may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the disclosed subject matter may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the disclosed subject matter is susceptible to various modifications and alternative constructions, certain illustrated embodiments thereof are shown in the drawings and have been described above in detail. It should be understood, however, that there is no intention to limit the disclosed subject matter to the specific forms disclosed, but on the contrary, the intention is to cover all modifications, alternative constructions, and equivalents falling within the spirit and scope of the disclosed subject matter.

What is claimed is:

1. A method comprising:
obtaining positioning data from a user device of a user, the positioning data identifying positions of the user device over a period of time as determined by a location sensor of the user device;
determining a current transportation mode of the user based at least upon the positioning data, the current transportation mode being determined based at least on a transition probability from a previously-determined transportation mode of the user to the current transportation mode; and
providing information to the user based at least upon the current transportation mode.

2. The method of claim 1, the positioning data comprising Global Positioning System (GPS) data and the location sensor comprising a GPS sensor.

3. The method of claim 1, further comprising:
extracting features from the positioning data; and
evaluating the features with an inference model to determine the current transportation mode.

4. The method of claim 3, further comprising:
learning the inference model from a dataset of other positioning data of other users.

5. The method of claim 3, wherein:
the positioning data includes location coordinates of the user device and timestamps indicating when the user device was present at the location coordinates, and
the extracting the features include extracting, based at least on the location coordinates and the timestamps, a first feature reflecting velocity of the user device and a second feature reflecting acceleration of the user device.

6. The method of claim 1, the providing comprising:
providing first information to the user when the current transportation mode is determined to comprise a first transportation mode; and
providing second information to the user when the current transportation mode is determined to comprise a second transportation mode.

7. The method of claim 6, wherein the first transportation mode is walking, the second transportation mode is riding in a vehicle, the first information includes a map presented at a first scale for the user when walking, and the second information includes the map presented at a second scale for the user when riding in the vehicle, the first scale being different than the second scale.

8. A system comprising:
a processing unit; and
a volatile or non-volatile storage device storing instructions which, when executed by the processing unit, cause the processing unit to:
determine a first transportation mode associated with a first segment based at least upon a second transportation mode associated with a second segment.

9. The system of claim 8, wherein the first segment and the second segment are determined using positioning data that identifies locations of a device.

10. The system of claim 9, the first segment corresponding to a first time interval and the second segment corresponding to a second time interval that occurs before the first time interval.

11. The system of claim 10, wherein the instructions, when executed by the processing unit, cause the processing unit to:
determine a probability associated with a transition between the second transportation mode and the first transportation mode,
wherein the first transportation mode is determined based at least on the probability.

12. The system of claim 10, wherein the instructions, when executed by the processing unit, cause the processing unit to:
separate the positioning data into the first segment and the second segment based at least on velocity or acceleration data obtained from the positioning data;
extract first features from the positioning data by processing first locations and first timestamps that are included in the positioning data and that are associated with the first segment;
extract second features from the positioning data by processing second locations and second timestamps that are included in the positioning data and that are associated with the second segment; and
determine the first transportation mode based at least on the first features and determine the second transportation mode based at least on the second features.

13. The system of claim 12, wherein the instructions, when executed by the processing unit, cause the processing unit to:
determine first probabilities of different transportation modes for the first segment based at least on the first features;
determine second probabilities of transitioning from the second transportation mode to the different transportation modes;
modify the first probabilities using corresponding second probabilities; and
select the first transportation mode using the modified first probabilities.

14. The system of claim 8, wherein the first transportation mode or the second transportation mode comprises at least one of walking, driving, bicycling, or commuting by bus.

15. A system comprising:
a processing unit; and
a volatile or non-volatile storage device storing instructions which, when executed by the processing unit, cause the processing unit to:
merge a first segment of positioning data with a second segment of positioning data based at least upon a determination that the first segment has a length below a threshold length.

16. The system of claim 15, wherein the instructions, when executed by the processing unit, cause the processing unit to:
determine a second transportation mode for the second segment based at least upon the positioning data; and
apply the second transportation mode to the first segment based at least on the determination that the first segment is below the threshold length.

17. The system of claim 16, wherein the positioning data identifies positions of a mobile device that generates the positioning data and the threshold length is expressed as a distance.

18. The system of claim 17, wherein the positioning data indicates that the mobile device traveled the second segment prior the first segment.

19. The system of claim 15, embodied as a mobile device.

20. The method of claim 1, the location data comprising Global Positioning System (GPS) data, the method further comprising:
- processing the GPS data to identify a plurality of walk segments where the user is determined to have been walking and a plurality of non-walk segments where the user is determined to have been using a transportation mode other than walking; and
- after identifying the plurality of walk segments and the plurality of non-walk segments, classifying the non-walk segments into at least two different vehicular transportation modes.

21. The method of claim 20, the at least two different vehicular transportation modes comprising travelling in a car and travelling on a bike.

22. The method of claim 20, the at least two different vehicular transportation modes comprising riding a bus and travelling on a bike.

* * * * *